United States Patent
Machado et al.

(10) Patent No.: US 12,275,447 B1
(45) Date of Patent: Apr. 15, 2025

(54) MULTIPLE PURPOSE DOLLY

(71) Applicant: NPS Public Furniture Corp., Clifton, NJ (US)

(72) Inventors: Anderson Galindo Machado, Bogota (CO); Alexander Crudo, Hoboken, NJ (US); Yehuda Freundlich, Passaic, NJ (US); Elchonon M. Jacobson, Passaic, NJ (US)

(73) Assignee: NPS Public Furniture Corp., Clifton, NJ (US)

( * ) Notice: Subject to any disclaimer, the term of this patent is extended or adjusted under 35 U.S.C. 154(b) by 0 days.

(21) Appl. No.: 18/939,858

(22) Filed: Nov. 7, 2024

(51) Int. Cl.
  *B62B 3/10* (2006.01)
  *B62B 3/02* (2006.01)
  *B62B 5/06* (2006.01)

(52) U.S. Cl.
  CPC ............. *B62B 3/108* (2013.01); *B62B 3/02* (2013.01); *B62B 5/061* (2013.01); *B62B 5/064* (2013.01); *B62B 2301/044* (2013.01)

(58) Field of Classification Search
  CPC .. B62B 3/108; B62B 3/02; B62B 3/00; B62B 3/10; B62B 5/061; B62B 5/064; B62B 5/00; B62B 5/06; B62B 2301/044; B62B 2301/04; B62B 2301/00
  See application file for complete search history.

(56) References Cited

U.S. PATENT DOCUMENTS

| | | | | |
|---|---|---|---|---|
| 2,291,474 A | * | 7/1942 | Kalmbach | B62B 3/108 280/47.131 |
| 2,846,233 A | * | 8/1958 | Burg | B65G 49/061 280/30 |
| 2,945,699 A | * | 7/1960 | Berlye | B62B 3/10 211/27 |
| 3,104,890 A | * | 9/1963 | Hill | B62B 1/12 280/47.27 |
| 3,338,591 A | * | 8/1967 | Rowland | B62B 3/10 297/239 |
| 4,360,211 A | * | 11/1982 | Blake | B62B 3/02 211/189 |
| 4,493,492 A | * | 1/1985 | Balabanova | B62B 3/10 15/260 |

(Continued)

OTHER PUBLICATIONS

"XpressPort Slant Stack Cart," https://mitylite.com/products/carts/xpressport-slant-stack-cart, MityLite, Retrieved on Jun. 26, 2024.

(Continued)

*Primary Examiner* — James M Dolak
(74) *Attorney, Agent, or Firm* — Weiss & Arons LLP

(57) ABSTRACT

An adjustable multi-purpose dolly for transferring furniture or objects of a plurality of sizes. The adjustable multi-purpose dolly may include a center frame assembly, a first end extension assembly and a second end assembly. The center frame assembly may form a bottom portion of the adjustable multi-purpose dolly. The first end extension assembly may form a first end portion of the adjustable multi-purpose dolly. The first end extension assembly may be slidably mounted to the center frame assembly. The second end extension assembly may form a second end portion of the adjustable multi-purpose dolly. The second end extension assembly may be slidably mounted to the center frame assembly.

10 Claims, 20 Drawing Sheets

(56) References Cited

U.S. PATENT DOCUMENTS

| | | | | | |
|---|---|---|---|---|---|
| 4,505,495 | A * | 3/1985 | Foss | ............... | B62B 3/02 16/113.1 |
| 5,037,117 | A * | 8/1991 | Hershberger | ........... | B62B 3/108 280/35 |
| 5,476,282 | A * | 12/1995 | Dahl | ............... | B62B 1/002 280/651 |
| 5,727,920 | A * | 3/1998 | Hull | ............... | B60P 3/127 280/43.19 |
| 5,871,219 | A * | 2/1999 | Elliott | ............... | B62B 3/108 280/47.35 |
| 6,217,045 | B1 * | 4/2001 | Leyton | ............... | B82Y 10/00 280/5.2 |
| 6,302,414 | B1 * | 10/2001 | Berthiaume | ............ | B62B 3/104 280/47.27 |
| 7,584,575 | B2 * | 9/2009 | Hallberg | ............... | E04H 3/28 108/115 |
| 8,042,829 | B2 * | 10/2011 | Hailston | ............... | B62B 3/022 280/30 |
| 8,088,984 | B2 * | 1/2012 | Meyer | ............... | G10G 7/005 84/421 |
| 8,418,709 | B2 * | 4/2013 | Lindeman | ............... | B62B 3/102 135/95 |
| 8,651,501 | B1 * | 2/2014 | Davis | ............... | B62B 5/0086 254/133 R |
| 11,192,566 | B2 * | 12/2021 | Ceja | ............... | B62B 3/008 |
| 11,358,619 | B2 * | 6/2022 | Yang | ............... | B62B 3/04 |
| 11,485,395 | B2 * | 11/2022 | Kumazawa | ........... | B62B 3/1492 |
| 11,554,800 | B2 * | 1/2023 | Su | ............... | B62B 5/067 |
| 12,091,850 | B2 * | 9/2024 | Levy | ............... | E04B 2/7427 |
| 2005/0236788 | A1 * | 10/2005 | Kellogg | ............... | B62B 1/12 280/79.2 |
| 2007/0216116 | A1 * | 9/2007 | Gallea | ............... | B62B 3/02 280/47.36 |

OTHER PUBLICATIONS

"XpressPort Lineless Slant Stack Cart," https://mitylite.com/products/carts/xpressport-lineless-slant-stack-cart, Retrieved on Jun. 26, 2024.

"GHD Table Trucks," https://southernaluminum.com/ghd-tabletruck-carts/, Southern Aluminum, Retrieved on Jun. 26, 2024.

Heavy-Duty Table Cart (20-22 Capacity), https://www.amtab.com/tsc6?q=cart, AmTab, Retrieved on Jun. 26, 2024.

Heavy-Duty Table Cart (8-10 Capacity), https://www.amtab.com/tc6?q=cart, AmTab, Retrieved on Jun. 26, 2024.

* cited by examiner

MULTIPLE PURPOSE DOLLY

FIELD OF TECHNOLOGY

Aspects of the disclosure relate to mechanical designs and apparatus. Specifically, aspects of the disclosure relate to furniture dollies.

BACKGROUND OF THE DISCLOSURE

Furniture is used every day. At times, a single piece of furniture is used for multiple purposes. A single piece of furniture can be used in various locations at separate times. Therefore, furniture is transported from one location to another location. Due to the weight and size of furniture, transporting furniture often becomes difficult. A furniture dolly assists in transporting furniture. A furniture dolly is a platform on wheels that holds and transports furniture. The furniture is placed on the dolly. The dolly can be wheeled from one location to another location. Often, a furniture dolly can transport multiple pieces of furniture simultaneously.

Conventionally, furniture dollies are designed to carry furniture having specific form factors. Accordingly, there are different furniture dollies for different furniture items. A chair dolly is designed transfer chairs. A seminar table dolly is designed to transfer seminar tables. However, a single furniture dolly cannot transport multiple types of furniture items. Conventional furniture dollies cannot even transfer furniture items of the same type having different form factors. Conventional furniture dollies are not designed to transport furniture of ranging widths, lengths, heights or weights other than the furniture for which the dolly was designed.

Furthermore, typical doorways measure 32-inches in width. At times, 18-inch-wide tables are placed side-by-side on a dolly. As such, the width of the dolly holding the side-by-side 18-inch tables is not less than 36-inches. Such a table-holding dolly is wider than a typical 32-inch-wide doorway. As such, a 36-inch-wide dolly is difficult, if not practically impossible, use for transporting the two 18-inch-wide tables in a side-by-side arrangement through many doorways.

Therefore, it would be desirable to create an adjustable multiple-purpose ("multi-purpose") furniture dolly. Such an adjustable multi-purpose furniture dolly may hold multiple types of furniture. Such an adjustable multi-purpose dolly may also hold multiple 18-inch-wide tables in an arrangement with a width of 32 inches or less.

SUMMARY OF THE DISCLOSURE

An adjustable multi-purpose dolly is provided. The multi-purpose dolly may be adjusted to transport different size furniture. Different size furniture may include furniture of a plurality of ranging size lengths, widths, heights and/or weights.

The multi-purpose dolly may include adjustable angle supports. Adjustable angle supports may hold furniture on an angle. As such, adjustable angle supports may enable furniture to be transported on an angle, thereby allowing more furniture to be transported at the same time.

For example, the dolly may hold 18-inch-wide tables. The angle supports may hold the tables at an angle. The angle may reduce the width of the multi-purpose dolly. As such, two stacks of 18-inch-wide tables may fit through a 32-inch doorway.

In some embodiments, the multi-purpose dolly may include removable support bars. The removable support bars may provide support for furniture in transit. The removable support bars may support furniture less than a predetermined length or width.

Aspects of the disclosure relate to a multiple-purpose ("multi-purpose") dolly. Methods, apparatus, and systems for a multi-purpose dolly and its usage and creation are provided.

A multi-purpose dolly may be a dolly used to transport furniture having various form factors. The multi-purpose dolly may include six casters, a bottom portion and two end portions. The two end portions may be adjustable to hold furniture of different length factors. The bottom portion may include six adjustable angle supports for holding furniture on an angle.

Furniture transported on such a dolly may include tables, chairs, benches, choral risers, seminar tables, stage tables, rectangular tables or any other suitable furniture. Tables may include stage tables, seminar tables, square tables, rectangular tables or any other suitable tables. The lengths and widths of the tables may vary.

The dimensions, including the length, width and height of the furniture may vary. Furniture stored and/or transported on the multi-purpose dolly may have a length of 60-inches, 72-inches, 96-inches or any other suitable length. The dolly may be adjusted to fit the length of the furniture. Furniture, such as tables may be 18-inches-wide or any other suitable width.

The multi-purpose dolly may include a plurality of support tubes. In certain embodiments, the dolly may include two support tubes. The support tubes may be removable. The support tubes may be replaceable within the multi-purpose dolly. The support tubes may support and/or secure furniture on the dolly. The support tubes may hold furniture on the dolly and prevent the furniture from sliding off the dolly. It should be noted that the support tubes may limit the width or length of furniture on the dolly. Therefore, when a furniture item being stored or transferred is greater than a predetermined length or width, the support tubes may be removed.

Each of the support tubes may be placed in a hole on the multi-purpose dolly. There may be a plurality of holes in the dolly. There may be a plurality of holes in a first end portion of the dolly. There may be a plurality of holes in a second end portion of the dolly. There may be a plurality of holes in a bottom portion of the dolly. The holes in the first end portion may correspond to the holes in the second end portion. Each support tube may correspond to a second support tube on the other end portion.

There may be a plurality of holes within the multi-purpose dolly for placement of the support tubes. The plurality of holes may accommodate different size furniture. Different holes and/or apertures may accommodate different size widths and lengths of furniture. In an embodiment where the furniture is greater than a predetermined length, the support tubes may be placed in a first set of holes. In an embodiment where the furniture is less than a predetermined length, the support tubes may be placed in a second set of holes. The predetermined length may be 50-inches, 90-inches or any other suitable length. As such, the support tubes may be placed in the first set of holes for furniture longer than 50 inches, 90 inches or any other suitable length.

Apertures included in the multi-purpose dolly may be engaged. As such, fasteners, such as screws may be used to connect a first component of the dolly to a second component of the dolly. Apertures may also be used to connect more than two components of the dolly. It should be noted that not all apertures may be engaged. Furthermore, not all apertures may be used to connect two or more components of the dolly. In certain embodiments, one or more apertures may remain unused.

The bottom portion of the dolly may include a center frame assembly. The center frame assembly may be the center of the multi-purpose dolly. The center frame assembly may be fixed. The center frame assembly may connect to the first end portion and to the second end portion. The center frame assembly may include a middle support bar, two angle support assemblies, two swivel casters, a right middle frame assembly and/or a left middle frame assembly.

The center frame assembly may include a middle support bar. The middle support bar may be a rectangular tube. The middle support bar may be formed from steel, aluminum, metal, plastic, wood or any other suitable material. The middle support bar may have four sides. The four sides may include a top side, a right side, a bottom side and a left side.

The middle support bar, with respect to the imaginary longitudinal axis, may be 800 millimeters ("mm") long or any other suitable length. The top side and bottom side of the middle support bar may be 40 mm wide. The height of the middle support bar may be 50 mm.

There may be apertures within the middle support bar. The apertures may be located on the right side and the left side. The apertures on the right side may preferably mirror the apertures on the left side. The middle support bar may include angle support apertures. The angle support apertures may be used for mounting the angle support assemblies to the middle support bar. The middle support bar may include crossbar mounting plate apertures. The crossbar mounting plate apertures may be used for screwing the crossbar mounting plates to the middle support bar.

The angle support apertures may be located 16.6 mm, or any other suitable distance, from the top of the right side. The angle support apertures may be located 16.6 mm, or any suitable distance, from the top of the left side. There may be seven, or any other suitable number of angle support apertures. The angle support apertures may be used to rotatably couple an angle support assembly to the middle support bar.

Each angle support assembly may be rotatably coupled to the middle support bar using two apertures on the right side and two apertures on the left side. Four of the seven angle assembly apertures may be used. The four angle assembly apertures that are used may determine at which angle the angle support assemblies are rotatably coupled. The plurality of angles may provide an increase in storage within the multi-purpose dolly.

Each angle support assembly may include an angle support and an angle locking assembly. The angle support may be formed from steel, aluminum, metal, plastic, wood or any other suitable material. The material may be 3 mm thick or any other suitable thickness. The angle support may have a powder coat. The angle support may have a plastic coat. The angle support may have any other suitable coat.

The angle support may have a rectangular face. The angle support may have a first wing that descends from a first edge of the face. The angle support may have a second wing that descends from a second edge of the face. The shape of the first wing may preferably mirror the shape of the second wing.

There may be four, or any other suitable number of apertures within the angle support. The first wing of the angle support may include two apertures. The second wing of the angle support may include two apertures. The apertures in the first wing may preferably mirror the apertures in the second wing. The first of the two apertures in the first wing may be in the center of the first wing. The second of the two apertures in the first wing may be in a bottom portion of the first wing. The first of the two apertures in the second wing may be in the center of the second wing. The second of the two apertures in the second wing may be in a bottom portion of the second wing. The apertures at the end of the angle support may fixedly mount the angle support to the middle support bar. The apertures at the middle of the angle support may fixedly mount the angle support to the angle locking assembly.

There may be an angle locking assembly included in the angle support assembly. The angle locking assembly may be used to lock the angle support assembly in place. The angle locking assembly may include an angle lock cylinder, a first angle lock, a second angle lock and/or an angle lock reinforcement.

The angle lock cylinder may be of a cylindrical shape. The angle lock cylinder may be formed from steel, aluminum, metal, plastic, wood or any other suitable material. The angle lock cylinder may be a steel rod or a rod made from any other suitable material. The angle lock cylinder may be 42 mm long or any other suitable length. The angle lock cylinder may be 15 mm in diameter. There may be an aperture running through the angle lock cylinder.

The first angle lock may be an oval shape. The first angle lock may be 140 mm long or any other suitable length. The first angle lock may be 5 mm deep or any other suitable depth. The first angle lock may be 18 mm wide or any other suitable width. The first angle lock may include two, or any other suitable number of apertures. The first aperture may be located 9 mm, or any other suitable distance, from the top edge of the first angle lock. The second aperture may be 9 mm, or any other suitable distance, from the bottom edge of the first angle lock. The second aperture may be used for rotatably coupling the angle support assembly to the middle support bar.

The second angle lock may also be an oval shape. The second angle lock may be 140 mm long or any other suitable length. The second angle lock may be 5 mm deep or any other suitable depth. The second angle lock may be 18 mm wide or any other suitable width. The second angle lock may include two or any other suitable number of apertures. The first aperture may be 9 mm from a top edge of the second angle lock. The second aperture may be 9 mm from a bottom edge of the second angle lock. The second aperture may be used. The threading may facilitate rotatably coupling the angle support assembly to the middle support bar.

The first aperture may be used to combine the angle support to the angle support bracket. A rivet may be fastened through the first aperture of the first angle lock. The rivet may further be fastened into the center aperture of the left wing and through the angle lock cylinder. The rivet may be further fastened through the center aperture of the right wing and through the second aperture of the second angle lock.

The second aperture of the first angle lock and the second angle lock may be used to facilitate mounting the angle support assembly to the middle support bar. Each of the second apertures may be used to facilitate rotatably coupling the angle support assembly to the middle support bar. A screw may be fastened through the second aperture of the first angle lock and through one of the seven apertures in the middle support bar. The angle support assembly may be mounted to the middle support bar at one of a plurality of apertures.

The angle lock reinforcement may be formed from steel, aluminum, metal, plastic, wood or any other suitable material. The angle lock reinforcement may be 5 mm thick or any other suitable size. The angle lock reinforcement may be welded to the first and second angle lock. As such, the first and second angle lock may form an assembly.

There may be two caster mounting plates included in the center frame assembly. The two caster mounting plates may be welded to the middle support bar. A first of the caster mounting plates may be welded to a first end of the bottom side of the middle support bar. A second of the caster mounting plates may be welded to a second end of the bottom side of the middle support bar. Each of the two caster mounting plates may be a square shape with four corners. There may be four, or any other suitable number of apertures within the caster mounting plates. Each of the four apertures may be located at each of the four corners of the caster mounting plates.

A screw may be used to mount the swivel casters to the caster mounting plates. There may be four, or any other suitable number of apertures within the swivel casters.

The center frame assembly may include a first middle frame assembly. The center frame assembly may include a second middle frame assembly. The first middle frame assembly may preferably mirror the second middle frame assembly. The first and second middle frame assemblies may include a crossbar mounting plate, two crossbar channels and a middle connection.

The first and second middle frame assemblies may include a crossbar mounting plate. The crossbar mounting plate may be formed from steel, aluminum, metal, plastic, wood or any other suitable material. The crossbar mounting plate may be a rectangular shape. The crossbar mounting plate may include a plurality of apertures. The plurality of apertures may correspond to the crossbar mounting plate apertures in the middle support bar. A screw may be used to mount the crossbar mounting plate to the middle support bar. The apertures in the crossbar mounting plate and the crossbar mounting plate apertures in the middle support bar may be used to facilitate mounting the crossbar mounting plate to the middle support bar.

The first and second middle frame assemblies may include two crossbar channels. The two crossbar channels may be formed from steel, aluminum, metal, plastic, wood or any other suitable material. The material may be 3 mm wide or any other suitable size. The crossbar channels may have three sides. The three sides may include a first side, a bottom side and a second side. There may be an open end. Extension tubes may be placed in the open end of the crossbar channels. There may be a first end on each of the two crossbar channels. There may be a second end on each of the two crossbar channels. The first end of each of the two crossbar channels may be welded, or otherwise connected, to the crossbar mounting plate.

There may be two apertures in each of the crossbar channels. A first of the apertures may be on the first side of the crossbar channels. A second of the apertures may be on the second side of the crossbar channels. The apertures on the first side of the crossbar may preferably mirror the apertures on the second side. The apertures may be used to facilitate mounting the extension tubes to the crossbar channels.

The first and second middle frame assemblies may include a middle connection. The middle connection may be formed from steel, aluminum, metal, plastic, wood or any other suitable material. The material may be 3 mm thick or any other suitable size. The middle connection may include four sides. The four sides may include a front side, a top side, a rear side and a bottom side. The top side of the middle connection may extend past the front, rear and back sides of the middle connection. The top and bottom sides may include a hole for placement of the support tubes. The front and rear sides may include holes for mounting the support tubes to the dolly. The front and rear sides may descend from the top side at a 90-degree angle. The front and rear sides may ascend from the bottom side at a 90-degree angle. As such, a box may be formed from the front, top, rear and bottom side.

The middle connection may be mounted to the crossbar channels. The top side of the middle connection may be mounted to the crossbar channels. The top side of the middle connection may extend past the front, rear and back sides of the middle connection forming a first extension and/or a second extension. The first extension may be mounted to a first of the crossbar channels. The second extension may be mounted to a second of the crossbar channels.

The first middle frame assembly and/or the second middle frame assembly may be mounted to the middle support bar. The first and/or second middle frame assemblies may be mounted to the middle support bar using the crossbar mounting plates. The first middle frame assembly may be mounted to the first side of the middle support bar. The second middle frame assembly may be mounted to the second side of the middle support bar. Apertures within the middle support bar and/or the caster mounting plates may be used to mount each of the middle frame assemblies to the middle support bracket.

The multi-purpose dolly may include a first end extension assembly. The first end extension assembly may form a first end portion of the multi-purpose dolly. The first end extension assembly may include a first end extension support bar, two extension tubes, two caster mounting plates, two lock swivel casters, two angle support assemblies, a fixed handlebar, a handlebar grip and/or a support tube.

The first end extension support bar may be parallel to the middle support bar. The first end extension support bar may be a rectangular tube. The first end extension support bar may be formed from steel or any other suitable material. The first end extension support bar may be coated in a powder coat or any other suitable coat. The first end extension support bar may have four sides. The four sides may include a top side, a first side, a bottom side and/or a second side.

The first end extension support bar may be 800 mm long or any other suitable length. The top side and/or bottom side of the first end extension support bar may be 40 mm wide. The height of the first end extension support bar may be 50 mm.

The first end extension support bar may include a plurality of apertures. There may be twenty-six apertures included in the first end extension support bar. There may be thirteen apertures on the first side of the first end extension support bar. There may be thirteen apertures on the second side of the first end extension support bar. The apertures on the first side may preferably mirror the apertures on the second side.

Seven of the apertures on the first side may be used to mount the two angle supports to the first end extension support bar. Seven of the apertures, or any other suitable number of apertures, on the second side may be used to mount the two, or any other suitable number of angle support assemblies to the first end extension support bar. Four of the apertures on the first side may be used to mount the two, or any other suitable number of apertures, extension tubes to the first end extension support bar. Four of the apertures on the second side may be used to mount the fixed handlebar to the first end extension support bar. Two of the apertures on the first side may be used to mount the support tube to the first end extension support bar. Two of the apertures on the second side may be used to mount the support tube to the first end extension support bar.

There may be two end extension tubes included in the first end extension assembly. The two end extension support tubes may be steel rectangular tubes. The two end extension tubes may have four sides. The four sides may include a first side, a top side, a second side and/or a bottom side. The two main extension tubes may include six apertures. The apertures may be used to mount the first end extension assembly to the center frame assembly.

There may be three apertures on the first side. There may be three apertures on the second side. There may be three sets of two apertures. Each of the three sets may provide the multi-purpose dolly with a different length. When a first set of apertures are used, the multi-purpose dolly may be 60-inches long. When a second set of apertures are used, the multi-purpose dolly may be 72-inches long. When a third set of apertures are used, the multi-purpose dolly may be 96-inches long.

It should be noted that the second end extension assembly includes a plurality of apertures. The plurality of apertures may correspond to the apertures in the first end extension tubes. As such, the length of the multi-purpose dolly may be based on the threading of the sets of apertures in both the first end extension assembly and/or the second end extension assembly.

The first end extension assembly may include two, or any other suitable number of caster mounting plates. The two caster mounting plates may be mounted to the bottom side of the first end extension support bar. A first of the caster mounting plates may be mounted to a first end of the bottom side of the first end extension tubes. A second of the caster mounting plates may be mounted to a second end of the bottom side of the first end extension tubes.

There may be two, or any other suitable number of lock swivel casters included in the first end extension assembly. Each of the two lock swivel casters may include a metal sheet, a wheel and/or a locking mechanism. The metal sheet may include four, or any other suitable number of apertures. A screw may be fastened through each of the apertures in the lock swivel casters and/or the caster mounting plates to mount the lock swivel casters to the first end extension assembly.

There may be two, or any other suitable number of angle support assemblies included in the first end extension assembly. The two angle support assemblies may be identical to the angle support assemblies included in the center frame assembly.

The angle support assemblies may be rotatably coupled to the first end extension support bar. A first angle support assembly may be rotatably coupled to a first portion of the first end extension support bar. The first portion of the first end extension support bar may be located with respect to the longitudinal axis of the center frame assembly. A second angle support assembly may be mounted to a second portion of the first end extension support bar. The second portion of the first end extension support bar may be located with respect to the longitudinal axis of the center frame assembly.

Four, or any other suitable number of the seven apertures on each side of the first end extension support bar may be used. As such, the angle support assembly may be rotatably coupled to the first end extension support bar. The angle support assemblies may be rotatably coupled at different angles. As such, the furniture may be held on the multipurpose dolly at a plurality of angles.

The first end extension assembly may include a fixed handlebar. The fixed handlebar may be formed from a square steel tube. The fixed handlebar may be a portion of a curved rectangle. The height of the fixed handlebar may be 1316 mm or any other suitable height. The fixed handlebar may include two legs. The fixed handlebar may include one or more apertures.

The bottom of each of the two legs may be welded or otherwise attached to a handle frame attachment. The handle frame attachment may be formed from steel. The handle frame attachment may be mounted to the first end extension assembly.

The first end extension assembly may include a handlebar grip. The handlebar grip may be formed from a steel round tube, a suitable round tube or any other suitable component. A screw may be fastened through the fixed handlebar and/or the handlebar grip. Therefore, the handlebar grip may be mounted to the fixed handlebar.

The first end extension assembly may further include a support tube. The support tube may be formed from steel. The support tube may be a steel round tube. The height of the support tube may be 1250 mm or any other suitable height. The support tube may have a powder coat or any other suitable coat. The support tube may be removable. The support tube may be replaceable within the first end extension assembly. The support tube may be mounted to an end of the first end extension support bar.

The multi-purpose dolly may include a second end extension assembly. The second end extension assembly may form a second end portion of the multi-purpose dolly. The second end extension assembly may include a second end extension support bar, two extension tubes, two caster mounting plates, two rigid casters, two angle support assemblies, a removable handlebar and/or a support tube.

The second end extension support bar may be parallel to the middle support bar. The second end extension support bar may be a rectangular tube. The second end extension support bar may be formed from steel or any other suitable material. The second end extension support bar may be coated in a powder coat or any other suitable coat. The second end extension support bar may have four sides. The four sides may include a top side, a first side, a bottom side and/or a second side.

The length of the second end extension support bar may be 800 mm or any other suitable length. The width of the top side and bottom side of the second end extension support bay may be 40 mm or any other suitable width. The height of the second end extension support bar may be 50 mm or any other suitable height.

The second end extension support bar may include a plurality of apertures. There may be twenty-six, or any other suitable number of apertures included in the second end extension support bar. There may be thirteen, or any other suitable number of apertures on the first side of the second end extension support bar. There may be thirteen apertures on the second side of the second end extension support bar. The apertures on the first side of the second end extension support bar may preferably mirror the apertures on the second side of the second end extension support bar.

There may be angle support assembly apertures. There may be seven angle support assembly apertures on the first side of the second end extension bar. There may be seven angle support assembly apertures on the second side of the second end extension bar. The angle support assembly apertures may be used to rotatably couple the angle support assembly to the second end extension support bar.

There may be extension tube apertures included in the second end extension support bar. There may be four extension tube apertures. The extension tube apertures may be used to mount the two extension tubes to the second end extension support bar.

There may be removable handlebar apertures. There may be four removable handlebar apertures on the second side of the second end extension bar. The removable handlebar apertures may be used to mount the removable handlebar to the second end extension assembly.

There may be four support tube apertures. There may be two support tube apertures on the first side. There may be four support tube apertures on the second side. The support tube apertures may be used to provide support for the support tubes.

There may be two, or any other suitable number of end extension tubes included in the second end extension assembly. The two end extension tubes may be steel. The two end extension tubes may be rectangular. The two end extension tubes may have four sides. The four sides may include a first side, a top side, a second side and/or a bottom side. The two end extension tubes may include six apertures. The apertures may be used to mount the second end extension assembly to the center frame assembly.

There may be three, or any other suitable number of apertures on the first side of the end extension tubes. There may be three, or any other suitable number of apertures on the second side of the end extension tubes. There may be three sets of two apertures. One of the three sets of apertures may be engaged. When a first set of apertures is engaged, the multi-purpose dolly may be 60-inches long. When a second set of apertures is engaged, the multi-purpose dolly may be 72-inches long. When a third set of apertures is engaged, the multi-purpose dolly may be 96-inches long.

It should be noted that end extension tubes in each of the first and second end extension assemblies may correspond to each other. As such, the same set of apertures may be engaged in the first and second end extension assemblies. In some embodiments, the set of apertures may be engaged in the two end extension tubes of the first end extension assembly may be different from the set of apertures used in the second end extension assembly.

The second end extension assembly may include two, or any other suitable number of caster mounting plates. The two caster mounting plates may be mounted to the bottom side of the second end extension support bar. A first of the caster mounting plates may be mounted to a first end of the bottom side. A second of the caster mounting plates may be mounted to a second end of the bottom side.

There may be two, or any other suitable number of rigid casters included in the second end extension assembly. The two rigid casters may include a metal sheet and a wheel. The metal sheet may include four apertures or any other suitable number. A screw may be fastened through each of the apertures in the rigid casters and the caster mounting plates. As such, the rigid casters may be mounted to the second end extension assembly.

There may be two, or any other suitable number of angle support assemblies included in the second end extension assembly. The two angle support assemblies may be identical to the angle support assemblies included in the center frame assembly. The angle support assemblies may be rotatably coupled to the second end extension support bar. A first angle support assembly may be rotatably coupled to a first portion of the second end extension support bar. The first portion may be located with respect to the longitudinal axis of the center frame assembly. A second angle support assembly may be mounted to a second portion of the second end extension support bar. The second portion may be located with respect to the longitudinal axis of the center frame assembly.

The angle support assemblies may be rotatably coupled at different angles to hold furniture on the multi-purpose dolly on an angle. The angle support assemblies may be mounted to the second end extension assembly using four or any other suitable number of the seven angle support assemblies.

The second end extension assembly may include a removable handlebar. The removable handlebar may be formed from a square steel tube. The removable handlebar may be a portion of curved rectangle. The height of the removable handlebar may be 1316 mm or any other suitable height. The removable handlebar may include two legs. The removable handlebar may include twelve apertures or any other suitable number of apertures.

The bottom of each of the two legs may be welded, or otherwise connected to a handle frame attachment. The handle frame attachment may be formed from steel. The handle frame attachment may be mounted to the second end extension assembly. As such, the removable handlebar may be mounted to the second end extension assembly.

The second end extension assembly may further include a support tube. The support tube may be formed from steel. The support tube may be a steel round tube. The height of the support tube may be 1250 mm or any other suitable height. The support tube may have a powder coat or any other suitable coat. The support tube may be removable. The support tube may be replaceable within the second end extension assembly. The support tube may be mounted to the second end crossbar channel. The support tube may be mounted to the second end extension support bar and an angle support assembly.

The multi-purpose dolly may be formed from steel. The multi-purpose dolly may be formed from 14-gauge steel, 13.5-gauge steel or any other suitable gauge steel. The multi-purpose dolly may be formed from any other suitable material.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
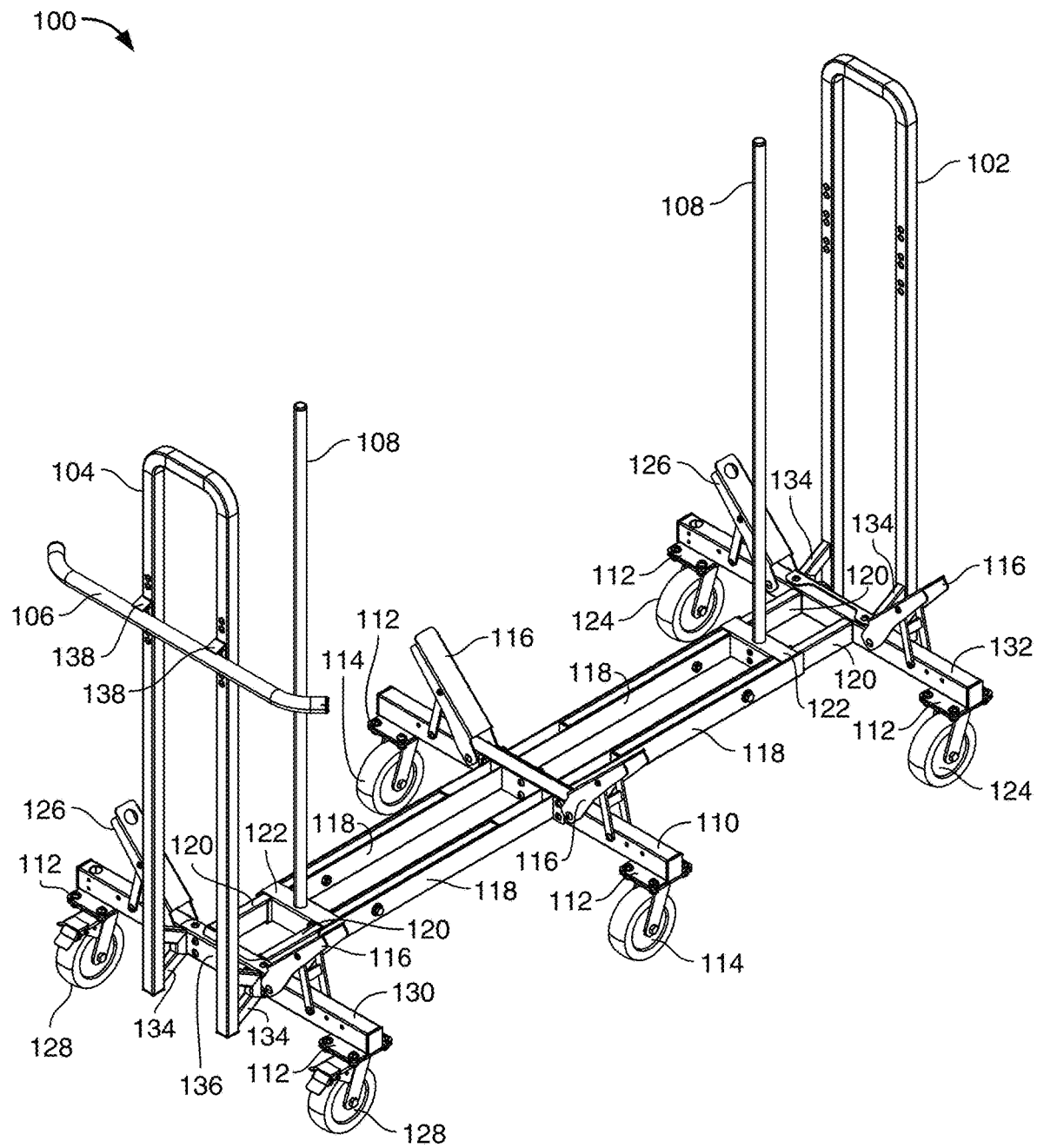
FIG. 1 shows an illustrative apparatus in accordance with principles of this matter.

Apparatus, methods and systems for a multi-purpose dolly is provided.

A multi-purpose dolly may include a center frame assembly. The center frame assembly may be centrally located within the multi-purpose dolly, with respect to an imaginative longitudinal and horizontal axis. The center frame assembly may form the bottom portion of the multi-purpose dolly. The center frame assembly may be the center of the multi-purpose dolly.

The center frame assembly may include a middle support bar. The middle support bar may be in the center of the center frame assembly. As such, the middle support bar may be the center of the multi-purpose dolly. The middle support bar may be formed from steel or any other suitable material. The middle support bar may be rectangular. The middle support bar may have four sides. The four sides may include a top side, a first side, a bottom side and a second side.

There may be apertures on the middle support bar. There may be twenty-six or any other suitable number of apertures on the middle support bar. Thirteen or any other suitable number of the apertures may be on the first side of the middle support bar. Thirteen or any other suitable number of the apertures may be on the second side of the middle support bar. The apertures on the first side may preferably mirror the apertures on the second side.

There may be seven, or any other suitable number of angle support assembly apertures on the first side of the middle support bar. There may be seven angle support assembly apertures on the second side of the middle support bar. The angle support assembly apertures may be situated in a horizontal line. The angle support assembly apertures may be used to mount two angle support assemblies to the middle support bar.

There may be six, or any other suitable number of crossbar mounting plate apertures on each side of the middle support bar. The crossbar mounting plate apertures may be used to mount each of the crossbar mounting plates to the middle support bar. The first crossbar mounting plate may be mounted to the first side of the middle support bar. The second crossbar mounting plate may be mounted to the second side of the middle support bar.

The center frame assembly may include two, or any other suitable number of caster mounting plates. The caster mounting plates may be rectangular. The caster mounting plates may include four apertures or any other suitable number. Each of the four apertures may be located at one of the four corners of the caster mounting plates. The caster mounting plates may be mounted to the bottom side of the middle support bar. A first caster mounting plate may be mounted to a first end of the middle support bar. A second caster mounting plate may be mounted to a second end of the middle support bar.

The center frame assembly may include two, or any other suitable number of swivel casters. The swivel casters may include a wheel and a rectangular metal sheet. The rectangular metal sheet may include four apertures or any other suitable apertures. The swivel casters may be mounted onto the caster mounting plates. A screw may be fastened through each aperture thereby mounting the swivel casters to the caster mounting plates.

The center frame assembly may include two, or any other suitable number of angle support assemblies. The angle support assemblies may be rotatably coupled to the middle support bar. The angle support apertures may be used for rotatably coupling the angle support assemblies to the middle support bar.

One of the two angle support assemblies may be rotatably coupled to a first portion of the middle support bar. The middle support bar may be divided into two portions with respect to the imaginary longitudinal axis. The second of the two angle support assemblies may be rotatably coupled to a second portion of the middle support bar.

The angle support assemblies may be adjustable within the angle support apertures. As such, there may be a plurality of ranging angles at which the dolly may hold the furniture. For purposes of the application, each angle support assembly rotatably coupled to each support bar may form an acute and obtuse angle. The obtuse angle may be with respect to a meeting point between the angle support assemblies and the support bar. The plurality of angles at which the multi-purpose dolly may be held may include on or about 135°, 142°, 152° or any other suitable obtuse angles.

The angle support assembly may include an angle support and an angle support locking assembly. It should be noted that the angle support of the angle support assembly may be mounted to the middle support bar. However, in some embodiments, the angle support locking assemblies may not be mounted to the middle support bar. In such an embodiment, the angle support locking assemblies may be mounted to the middle support bar on a 180° angle.

The center frame assembly may include a first middle frame assembly. The first middle frame assembly may be mounted to the first side of the middle support bar. The first middle frame assembly may include two, or any other suitable number of first crossbar channels. The two first crossbar channels may be rectangular with an open side. There may be a closed side, a right outer side, a left outer side, an open side, a right inner side and a left inner side. The two first crossbar channels may include two edges, a first edge and a second edge.

The open side of each of the first crossbar channels may provide a track for placement of the first end extension assembly. Each of the two first crossbar channels may include two apertures or any other suitable number of apertures. One aperture may be on the right inner side and right outer side. One aperture may be on the left inner side and left outer side. The two apertures may be used to mount the end extension tubes to the center frame assembly.

The first middle frame assembly may include a first middle connection. The first middle connection may be a rectangular shape. The first middle connection may be perpendicularly mounted onto the first edge of each of the two first crossbar channels.

The first middle frame assembly may include a first crossbar mounting plate. The first crossbar mounting plate may be mounted onto the second edge of the first crossbar channels parallel to the first middle connection. The first crossbar mounting plate may include six apertures, or any other suitable number of apertures. The six apertures, or any other suitable number of apertures, may be used to mount the first crossbar mounting plate to the middle support bar.

The center frame assembly may include a second middle frame assembly. The second middle frame assembly may be mounted to the second side of the middle support bar. The second side of the middle support bar may include six, or any other suitable number of crossbar mounting plate apertures. The second crossbar mounting plate apertures may be used to mount the second middle frame assembly to the middle support bar.

The second middle frame assembly may include two, or any other suitable number of second crossbar channels. The two second crossbar channels may be rectangular with an open side. There may be a closed side, a right outer side, a left outer side, an open side, a right inner side and a left inner side. The two second crossbar channels may include two or any other suitable number edges. The two edges may be a first edge and a second edge.

The open side of each of the second crossbar channels may provide a track for placement of the second end extension assembly. Each of the two second crossbar channels may include two apertures or any other suitable number of apertures. One aperture may be on the right inner side and right outer side. One aperture may be on the left inner side and left outer side. The two apertures may be used to mount the end extension tubes to the center frame assembly.

The second middle frame assembly may include a second middle connection. The second middle connection may be a rectangular shape. The second middle connection may be perpendicularly mounted onto the first edge of each of the two second crossbar channels.

The second middle frame assembly may include a second crossbar mounting plate. The second crossbar mounting plate may be mounted onto the second edge of the second crossbar channels. As such, the second crossbar mounting plate may be parallel to the second middle connection. The second crossbar mounting plate may include six apertures or any other suitable number of apertures. The six or any other suitable number of apertures may be used to mount the second crossbar mounting plate to the middle support bar.

The multi-purpose dolly may include a first end extension assembly. The first end extension assembly may form a first end portion of the multi-purpose dolly. The first end extension assembly may be slidably mounted to the first middle frame assembly. The first end extension assembly may include a plurality of apertures. In each embodiment, two of the plurality of apertures may be used to mount the first end extension assembly to the first middle frame assembly. As such, the multi-purpose dolly may be configured in one or more of a plurality of sizes.

The first end extension assembly may include two, or any other suitable number of first end extension tubes. The two first end extension tubes may be rectangular. The two first end extension tubes may have a top side, a first side, a bottom side and a second side. The two first end extension tubes may slide into the two first crossbar channels.

Each of the two first end extension tubes may include six, or any other suitable number of apertures. There may be three, or any other suitable number of apertures on the first side. There may be three, or any other suitable number of apertures on the second side. In each embodiment, one of the three apertures on each side may be used to mount the first end extension tubes to the multi-purpose dolly. As such, the multi-purpose dolly may have the ability to adjust to different lengths.

The first crossbar channels may include two apertures or any other suitable number of apertures. One of the apertures may be on the first side. One of the apertures may be on the second side. The apertures on the first crossbar channels and the apertures on the first end extension tubes may be used to mount the first end extension tubes to the first crossbar channels.

When a first set of apertures are used, the multi-purpose dolly may be 60-inches-long. When a second set of apertures are used, the multi-purpose dolly may be 72-inches long. When a third set of apertures are used, the multi-purpose dolly may be 96-inches long. It should be noted that the second end extension assembly may be fastened at the same set of the three apertures that the first end extension assembly is fastened. As such, the multi-purpose dolly may be 60-inches, 72-inches, 96-inches or any other suitable length.

The first end extension assembly may include a first end extension support bar. The first end extension support bar may be parallel to the middle support bar. The first end extension support bar may be formed from steel or any other suitable material. The first end extension support bar may be rectangular. The first end extension support bar may include four sides. The four sides may include a top side, a first side, a bottom side and a second side.

There may be apertures on the first end extension support bar. There may be twenty-four, or any other suitable number of apertures on the first end extension support bar. Twelve, or any other suitable number of the apertures may be on the first side of the first end extension support bar. Twelve, or any other suitable number of the apertures may be on the second side of the first end extension support bar. The apertures on the first side may preferably mirror the apertures on the second side.

There may be seven, or any other suitable number of angle support assembly apertures on the first side of the middle support bar. There may be seven, or any other suitable number of angle support assembly apertures on the second side of the middle support bar. The angle support assembly apertures may be situated in a horizontal line. The angle support assembly apertures may be used to mount two, or any other suitable number of angle support assemblies to the middle support bar.

There may be four, or any other suitable number of extension tube apertures on the first side of the first end extension assembly. The four, or any other suitable number of extension tube apertures may be used to mount the first two end extension tubes to the first end extension support bar. There may be a backend on each of the two first end extension tubes. The backend may have two apertures or any other suitable number of apertures. The two apertures on each of the first end extension tubes may match two of the four apertures on a first side of the first end extension support bar. As such, the backend may be mounted to the first end extension support bar.

There may be four, or any other suitable number of fixed handlebar apertures on the second side of the first end extension support bar. The four, or any other suitable number of fixed handlebar apertures may be used to mount a fixed handlebar assembly to the first end extension assembly.

The first end extension support bar may include two, or any other suitable number of caster mounting plates. The caster mounting plates may be a rectangular shape. The caster mounting plates may include four, or any other suitable number of apertures. Each of the four apertures may be located at one of the four corners of the caster mounting plates. The caster mounting plates may be mounted to the bottom side of the first end extension support bars. A first of the caster mounting plates may be mounted to a first end of the first end extension support bar. A second of the caster mounting plates may be mounted to a second end of the first end extension support bar.

The first end extension assembly may include two, or any other suitable number of lock swivel casters. The lock swivel casters may include a wheel and a rectangular metal sheet. The rectangular metal sheet may include four apertures. The lock swivel casters may be mounted onto the caster mounting plates. A screw may be fastened through each aperture to mount the swivel casters to the caster mounting plates.

The first end extension assembly may include two angle support assemblies. The angle support assemblies may be rotatably coupled to the first end extension support bar. The angle support apertures may be used for rotatably coupling the angle support assemblies to the first end extension support bar.

One of the two angle support assemblies may be rotatably coupled to a first portion of the first end extension support bar. The first end extension support bar may be divided into two portions with respect to the imaginary longitudinal axis. The second of the two angle support assemblies may be rotatably coupled to a second portion of the first end extension support bar. The two angle support assemblies may preferably mirror each other when mounted to the first end extension support bar.

The angle support assemblies may be adjustable within the angle support apertures. As such, there may be a plurality of angles at which the dolly may hold the furniture. The plurality of angles at which the multi-purpose dolly may be held may include 135°, 142°, 152° or any other suitable degree angle.

It should be noted that the angle support of the angle support assembly may be mounted to the first end extension support bar. However, the angle support locking assemblies may not be mounted to the middle support bar. In such an embodiment, the angle support locking support may slide underneath the angle support.

The first end extension assembly may include a fixed handlebar. The fixed handlebar may be a portion of a curved rectangle. There may be a top bar. There may be two legs or any other suitable number of legs. The fixed handlebar may be mounted to the second side of the first end extension support bar. Each leg of the fixed handlebar may be welded to a handle frame attachment. The four, or any other suitable number of fixed handlebar apertures may be used to mount the fixed handlebar assembly to the first end extension assembly.

The first end extension assembly may include a handle grip. The fixed handlebar may include twelve handlebar grip apertures or any other suitable number of apertures. Each leg may include six handlebar grip apertures or any other suitable number of apertures. There may be three, or any other suitable number of sets of the apertures on the handlebar. The handle grip may be mounted onto one of the sets of apertures on the handlebar. Each set of apertures may correspond to a different handlebar height. The height of the handle grip may be adjustable between the three sets of apertures. The handle grip may be adjusted to any suitable height. The handle grip may be adjustable for users of different heights. The handle grip may be used to maneuver the multi-purpose dolly.

The multi-purpose dolly may include a second end extension assembly. The second end extension assembly may form a second end of the multi-purpose dolly. The second end extension assembly may be slidably mounted to the second middle frame assembly. The second end extension assembly may include a plurality of apertures. In each embodiment, two of the plurality of apertures may be used to mount the second end extension assembly to the second middle frame assembly. As such, there may be multiple sizes of the multi-purpose dolly.

The second end extension assembly may include two, or any other suitable number of second end extension tubes. The two second end extension tubes may be rectangular. The two second end extension tubes may have a top side, a first side, a bottom side and a second side. The two second end extension tubes may slide into the two second crossbar channels.

Each of the two second end extension tubes may include six apertures or any other suitable number of apertures. There may be three, or any other suitable number of apertures on the first side of the second end extension tubes. There may be three, or any other suitable number of apertures on the second side of the second end extension tubes. In each embodiment, one of the three apertures on each side may be used to mount the first end extension tubes to the multi-purpose dolly. As such, the multi-purpose dolly may be adjustable to different lengths.

The second crossbar channels may include two apertures or any other suitable number of apertures. One, or any other suitable number of the apertures may be on the first side of the second crossbar channels. One, or any other suitable number of the apertures may be on the second side of the second crossbar channels. The apertures on the second crossbar channels and the apertures on the second end extension tubes may be used to mount the second end extension tubes to the second crossbar channels.

There may be three, or any other suitable number of sets of apertures in the second end extension tubes. When a first set of the apertures are used to mount the second end extension assembly, the multi-purpose dolly may be 60-inches long. When a second set of the apertures are used to mount the second end extension assembly, the multi-purpose dolly may be 72-inches long. When a third set of the apertures are used to mount the second end extension assembly, the multi-purpose dolly may be 96-inches long.

It should be noted that the three sets of apertures in the first end extension assembly may correspond to the three sets of apertures in the second end extension assembly. The set of apertures used to mount the first end extension assembly may correspond to the set of apertures used to mount the second end extension assembly. In an embodiment where the first sets of apertures are used to mount each end extension assembly, the multi-purpose dolly may be 60-inches long. In an embodiment where each of the second sets of apertures are used to mount each end extension assembly, the multi-purpose dolly may be 70-inches long. In an embodiment where each of the third set of apertures are used to mount each end extension assembly, the multi-purpose dolly may be 96-inches long.

In certain embodiments, the sets of apertures used to mount the first end extension assembly may not correspond to the sets of apertures used to mount the second end extension assembly. In such embodiments, the multi-purpose dolly may be any suitable length.

The second end extension assembly may include a second end extension support bar. The second end extension support bar may be parallel to the middle support bar. The second end extension support bar may be formed from steel or any other suitable material. The second end extension support bar may be rectangular. The second end extension support bar may include four sides or any other suitable number of sides. The sides may include a top side, a first side, a bottom side and a second side.

There may be apertures on the second end extension support bar. There may be twenty-four apertures, or any other suitable number of apertures, on the second end extension support bar. Twelve, or any other suitable number of the apertures may be on the first side of the second end extension support bar. Twelve, or any other suitable number of the apertures may be on the second side of the second end extension support bar. The apertures on the first side may preferably mirror the apertures on the second side.

There may be seven, or any other suitable number of angle support assembly apertures on the first side. There may be seven, or any other suitable number of angle support assembly apertures on the second side of the middle support bar. The angle support assembly apertures may be situated in a horizontal line. The angle support assembly apertures may be used to mount two, or any other suitable number of angle support assemblies to the middle support bar.

There may be four, or any other suitable number of extension tube apertures on the first side of the second end extension assembly. The four, or any other suitable number of extension tube apertures may be used to mount the second two end extension tubes to the second end extension support bar. There may be a front end on each of the two second end extension tubes. The front end may have two apertures or any other suitable number of apertures. The two, or any other suitable number of apertures on each of the first end extension tubes may match two, or any other suitable number of the four apertures on the first side of the second end extension support bar. As such, the front end may be mounted to the second end extension support bar.

There may be four, or any other suitable number of removable handlebar apertures on the second side of the second end extension support bar. The four, or any other suitable number of removable handlebar apertures may be used to mount a removable handlebar assembly to the second end extension assembly.

The second end extension support bar may include two, or any other suitable number of caster mounting plates. The caster mounting plates may be a rectangular shape. The caster mounting plates may include four apertures or any other suitable number of apertures. Each of the four apertures may be located at one of the four corners of the caster mounting plates. The caster mounting plates may be mounted to the bottom side of the second end extension support bars. A first of the caster mounting plates may be mounted to a first end of the second end extension support bar. A second of the caster mounting plates may be mounted to a second end of the second end extension support bar.

The second end extension assembly may include two, or any other suitable number of rigid casters. The rigid casters may include a wheel and/or a rectangular metal sheet. The rectangular metal sheet may include four apertures or any other suitable number of apertures. The rigid casters may be mounted onto the caster mounting plates. A screw may be fastened through each aperture to mount the swivel casters to the caster mounting plates.

The second end extension assembly may include two, or any other suitable number of angle support assemblies. The angle support assemblies may be rotatably coupled to the second end extension support bar. The angle support apertures may be used for rotatably coupling the angle support assemblies to the second end extension support bar.

One of the two angle support assemblies may be rotatably coupled to a first portion of the second end extension support bar. The second end extension support bar may be divided into two portions with respect to the imaginary longitudinal axis. The second of the two angle support assemblies may be rotatably coupled to a second portion of the second end extension support bar. The location of the first angle support assembly on the first portion of the second end support bar may mirror the location of the second angle support assembly on the second portion of the second end support bar.

The angle support assemblies may be adjustable within the angle support apertures. As such, there may be a plurality of angles at which the dolly may hold the furniture. The plurality of angles at which the multi-purpose dolly may be held may include 135°, 142°, 152° or any other suitable angle.

It should be noted that the angle support of the angle support assembly may be mounted to the first end extension support bar. However, the angle support locking assemblies may not be mounted to the middle support bar. In such an embodiment, the angle support locking support may slide underneath the angle support.

The second end extension assembly may include a removable handlebar. The multi-purpose dolly may transport furniture greater than the length of the multi-purpose dolly. In such an embodiment, the removable handlebar may be removed to accommodate the length of the furniture. As such, when the removable handlebar is removed from the dolly, the dolly is operable to handle furniture with a length less than, greater than or equal to 96-inches.

The removable handlebar may be a portion of a curved rectangle. There may be a top bar. There may be two legs or any other suitable number of legs. The removable handlebar may be mounted to the second side of the second end extension support bar. Each leg of the removable handlebar may be welded to the handle frame attachment. The four, or any other suitable number of fixed handlebar apertures may be used to mount the removable handlebar assembly to the second end extension assembly.

The multi-purpose dolly may be formed from steel. The multi-purpose dolly may be formed from 14-gauge steel, 13.5-gauge steel or any other suitable gauge steel. The multi-purpose dolly may be formed from any other suitable material.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure. The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions or computer-readable data structures. In this regard, other embodiments are disclosed herein as well that can be partially or wholly implemented on a computer-readable medium, for example, by storing computer-executable instructions or modules or by utilizing computer-readable data structures. For example, methods for producing an apparatus may, in certain embodiments, be wholly or partially executed by designing the apparatus via software, such as computer aided design (CAD) software.

FIG. 1 shows an illustrative apparatus in accordance with the principles of the disclosure. Apparatus 100 is a multi-purpose dolly. Multi-purpose dolly 100 may be used to transport furniture. The furniture may be a plurality of sizes and/or form factors. Multi-purpose dolly 100 may be extendable and adjustable to a plurality of sizes to fit the furniture being transported.

Multi-purpose dolly 100 may include a center frame assembly, a first end extension assembly and/or a second end extension assembly. First and second end extension assemblies may be extended and retracted to accommodate different size furniture. Center frame assembly may be a fixed length to provide multi-purpose dolly 100 with a solid base.

Multi-purpose dolly 100 may include removable handlebar 102. Removable handlebar 102 may form a part of the first end extension assembly. Removable handlebar 102 may form a part of the second end extension assembly. Removable handlebar 102 may preferably be mounted onto multi-purpose dolly 100. Removable handlebar 102 may be removed from multi-purpose dolly 100. Removable handlebar 102 may form an end of multi-purpose dolly 100.

In some embodiments, furniture transported on the dolly may be greater than the length of multi-purpose dolly 100. In such an embodiment, removable handlebar 102 may be removed to accommodate the length of the furniture. Such embodiments may include furniture greater than 60-inches, 72-inches, 96-inches or any other suitable measurement.

A user may use removable handlebar 102 when transporting multi-purpose dolly 100. The user may push and pull multi-purpose dolly 100 with removable handlebar 102. Removable handlebar 102 may be at a first end of multi-purpose dolly 100. Removable handlebar 102 may be at a second end of multi-purpose dolly 100. Removable handlebar 102 may include apertures for placement of a handlebar grip. In certain embodiments, removable handlebar 102 may be used as a fixed handlebar.

Multi-purpose dolly 100 may include fixed handlebar 104. Fixed handlebar 104 may form part of the first end extension assembly. Fixed handlebar 104 may form part of the second end extension assembly. Fixed handlebar 104 may be fixed onto multi-purpose dolly 100. Fixed handlebar 104 may provide an end for multi-purpose dolly 100. Fixed handlebar 104 may secure the furniture on multi-purpose dolly 100. A user transporting multi-purpose dolly 100 may use fixed handlebar 104.

Multi-purpose dolly 100 may include handlebar grip 106. Handlebar grip 106 may preferably be mounted onto fixed handlebar 104. In some embodiments, handlebar grip 106 may preferably be mounted onto removable handlebar 102. The height of handlebar grip 106 may be adjustable within fixed handlebar 104. There may be height adjustable apertures within fixed handlebar 104. The apertures may enable attaching handlebar 106 to various heights on fixed handlebar 104. The apertures may be for mounting handlebar grip 106 at different heights. It should be noted that removable handlebar 102 may include apertures. Handlebar grip 106 may be mounted to removable handlebar 102 using the apertures included in removable handlebar 102.

Figure 13:
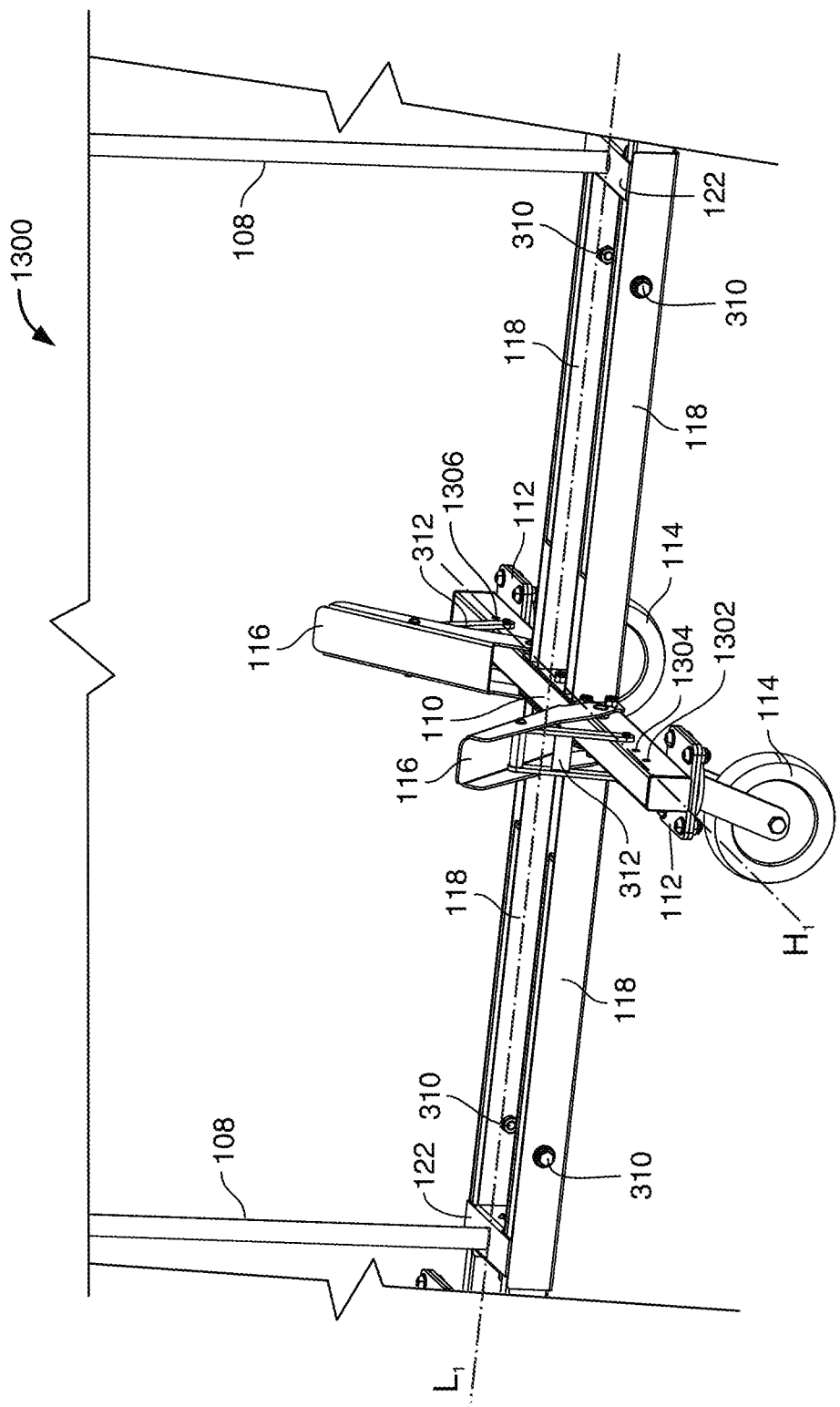
FIG. 13 shows another portion of the illustrative apparatus in accordance with principles of this matter.

A handle frame attachment support assembly may be used to mount removable handlebar 102 and fixed handlebar grip 106 to the multi-purpose dolly. The handle frame attachment support assembly may include two, or any other suitable number of handle frame attachments 134 and two, or any other suitable number of handle frame supports 136. Fixed handlebar attachment support assembly may include two, or any other suitable number of handle brackets 138 for handlebar grip 106. The handle frame attachment support assembly is shown in FIG. 13 and described in the portion of the specification corresponding thereto.

Multi-purpose dolly 100 may include two, or any other suitable number of support tubes. The support tubes may be support tubes 108. Support tubes 108 may stabilize the furniture load of the dolly. Support tubes 108 may be used to support furniture placed on multi-purpose dolly 100. Support tubes 108 may be placed within different holes in multi-purpose dolly 100. As such, the support tubes may provide support for different sizes of furniture. Furthermore, the support tubes may provide support for furniture placed on different angles.

Support tubes 108 may be removable. Support tubes may be replaceable within the multi-purpose dolly. Support tubes 108 may support furniture on the dolly. Support tubes 108 may secure furniture on the dolly. Support tubes 108 may hold furniture on the dolly to prevent the furniture from sliding off. Support tubes 108 may limit the width or length of furniture on the dolly. Therefore, in an embodiment with furniture greater than a predetermined length or width, the support tubes may be removable to accommodate the oversize furniture.

Each of support tubes 108 may be fixedly located in a hole on the multi-purpose dolly. There may be a plurality of holes in the dolly. There may be a plurality of holes in the first end portion of the dolly. There may be a plurality of holes in the second end portion of the dolly. There may be a plurality of holes in the bottom portion of the dolly. The holes in the first end portion of the dolly may correspond to the holes in the second end portion of the dolly. As such, support tubes 108 may be located at a corresponding distance on each end of the dolly.

Different holes and/or apertures may be used to accommodate ranging sizes, widths and/or lengths of furniture. In an embodiment where the furniture is greater than a predetermined length, the support tubes may be fixedly located in a first set of holes. In an embodiment where the furniture is less than a predetermined length, the support tubes may be fixedly located in a second set of holes. The predetermined length may include furniture greater than 50-inches, 90-inches or any other suitable length.

The furniture on multi-purpose dolly 100 may be stored on an angle. In such an embodiment, support tubes 108 may be placed in a first set of holes. As such, support tubes 108 may provide multi-purpose dolly 100 with support for furniture placed on an angle.

Furniture may be stored flat on multi-purpose dolly 100. As such, when the dolly is transported from one location to another location, the furniture may move from side to side. In such an embodiment, a second set of holes may be engaged with support tubes 108. Support tubes 108 may enable multi-purpose dolly 100 to securely transport furniture that is stored horizontally with respect to the center frame assembly.

Furniture being transported on the multi-purpose dolly may range in size. The width of the furniture may range from on or about one-inch to on or about 60-inches, or any other suitable width. In some embodiments, furniture may be wider than the width of the multi-purpose dolly. In such embodiments, support tubes 108 may be removed from multi-purpose dolly 100.

Multi-purpose dolly 100 may include middle support bar 110. Middle support bar 110 may be the center of multi-purpose dolly 100. Middle support bar 110 may be the center of the center frame assembly. Middle support bar 110 may form a middle support bar assembly.

The middle support bar assembly may include middle support bar 110. The middle support bar assembly may include two caster mounting plates 112 or any other suitable number of caster mounting plates. Caster mounting plates 112 may be sheets of metal mounted to middle support bar 110. Caster mounting plates 112 may include four apertures, or any other suitable number of apertures. The four apertures, or any other suitable number of apertures, may be used to mount casters to multi-purpose dolly 100.

The middle support bar assembly may include two swivel casters 114 or any other suitable number of swivel casters. Swivel casters 114 may preferably be mounted onto caster mounting plates 112. Caster mounting plates 112 may interface between swivel caster 114 and dolly 100. As such, caster mounting plates 112 may enable swivel casters 114 to be mounted onto multi-purpose dolly 100.

The middle support bar assembly may include two, or any other suitable number of angle support assemblies 116. Angle support assemblies 116 may be mounted to multi-purpose dolly 100 at different angles. The angles may include 135°, 142°, 152° or any other suitable angle. As such, the furniture may be stored at a plurality of angles. Angle support assemblies 116 may preferably be mounted to middle support bar 110 using two or more apertures. Each angle support assembly may preferably be mounted to an identical aperture. There may be a selection of apertures for placement of the angle support assemblies 116 on multi-purpose dolly 100.

In some embodiments, the furniture may be placed flat on multi-purpose dolly 100. As such, angle support assemblies 116 may be attached to middle support bar 110 to enable transport and/or store of furniture in a horizontal manner.

There may be a plurality of angle support assemblies included in multi-purpose dolly 100. Some of the angle support assemblies may have holes. Some of the angle support assemblies may not have holes. Angle support assemblies 126 may be angle support assemblies with holes. Angle support assemblies 126 may include holes for placement of support tubes 108. Angle support assemblies 126 may be fixedly mounted to the multi-purpose dolly at a 135°, 142°, 152°, 180° angle or any other suitable angle. Angle support assemblies 126 may not be mounted on an angle when used with support tubes 108. Angle support assemblies 126 may be fixedly located at any other suitable angle when used with support tubes 108. Angle support assemblies 126 may form part of the first end extension assembly. Angle support assemblies 126 may form part of the second end extension assembly.

Multi-purpose dolly 100 may include crossbar channels 118. There may be four crossbar channels, or any other suitable number of crossbar channels. Crossbar channels 118 may form a part of the center frame assembly. Crossbar channels 118 may include a plurality of sides. The sides may include a right side, a middle side and a left side. There may be an open side for the first and second end extension assemblies to mount to the center frame assembly. There may be apertures in each of crossbar channels 118. The apertures may be used to mount the first end extension assemblies to the center frame assembly. The apertures may be used to mount the second end extension assembly to the center frame assembly.

Multi-purpose dolly 100 may include extension tubes 120. There may be four extension tubes 120, or any other suitable number of extension tubes. Two of the extension tubes may form a part of the first end assembly. Two of the extension tubes may form a part of the second end extension assembly. Each extension tube may be slidably mounted into crossbar channels 118. Each extension tube may preferably be mounted to one of crossbar channels 118.

There may be a plurality of sets apertures in each extension tube. There may be three, or any other suitable number of sets of apertures in each extension tube. Each extension tube may be mounted to a crossbar channel using one of the three sets of apertures. When each of the three sets of apertures are engaged, the multi-purpose dolly may be a different length. As such, the multi-purpose dolly may be a variety of lengths.

Multi-purpose dolly 100 may include two, or any other suitable number of middle connections 122. Middle connections 122 may form a part of the center frame assembly. Middle connections 122 may form a part of the first middle frame assembly. Middle connections 122 may form a part of the second middle frame assembly. Middle connections 122 may preferably connect each of crossbar channels 118.

Multi-purpose dolly 100 may include a plurality of casters. The casters may assist in transporting multi-purpose dolly 100. There may be casters used for different portions of multi-purpose dolly 100. The plurality of casters may ease transporting multi-purpose dolly 100. Multi-purpose dolly 100 may include swivel casters 114, as shown and described above. Multi-purpose dolly 100 may include rigid casters 124. Rigid casters 124 may form a part of the second end extension assembly. Multi-purpose dolly 100 may further include lock swivel casters 128. Lock swivel casters 128 may form a part of the first end extension assembly. Lock swivel casters 128 may include a lock mechanism on the casters. A user may use the lock mechanism to stop multi-purpose dolly 100.

Multi-purpose dolly 100 may include first end extension support bar 130. First end extension support bar 130 may form a part of the first end extension assembly. First end extension support bar 130 may be parallel to middle support bar 110. First end extension support bar 130 may be rectangular. First end extension support bar 130 may include a top side, a first side, a bottom side and/or a second side.

First end extension support bar 130 may include angle support assembly 116 and angle support assembly 126. Angle support assembly 116 and angle support assembly 126 may be rotatably coupled to the top side of first end extension support bar 130. First end extension support bar 130 may include two, or any other suitable number of caster mounting plates 112. Caster mounting plates 112 may be mounted to the bottom side first end extension support bar 130. A first of caster mounting plates 112 may preferably be mounted to a first end of the bottom side of first end extension support bar 130. A second of caster mounting plates 112 may preferably be mounted to a second end of the bottom side of first end extension support bar 130. Each of caster mounting plates 112 may preferably be mounted to one of lock swivel casters 128.

Multi-purpose dolly 100 may include second end extension support bar 132. Second end extension support bar 132 may form a part of the second end extension assembly. Second end extension support bar 132 may be parallel to middle support bar 110. Second end extension support bar 132 may be rectangular. Second end extension support bar 132 may include a top side, a first side, a bottom side and/or a second side.

Second end extension support bar 132 may include angle support assembly 116 and angle support assembly 126. Angle support assembly 116 and angle support assembly 126 may be rotatably coupled to the top side of second end extension support bar 132. Second end extension support bar 132 may include two caster mounting plates 112. Caster mounting plates 112 may be mounted to the bottom side of second end extension support bar 132. A first of caster mounting plates 112 may preferably be mounted to a first end of the bottom side second end extension support bar 132. A second of caster mounting plates 112 may preferably be mounted to a second end of the bottom side second end extension support bar 132. Each of the two caster mounting plates 112 may preferably be mounted to one of rigid casters 124.

Figure 2:
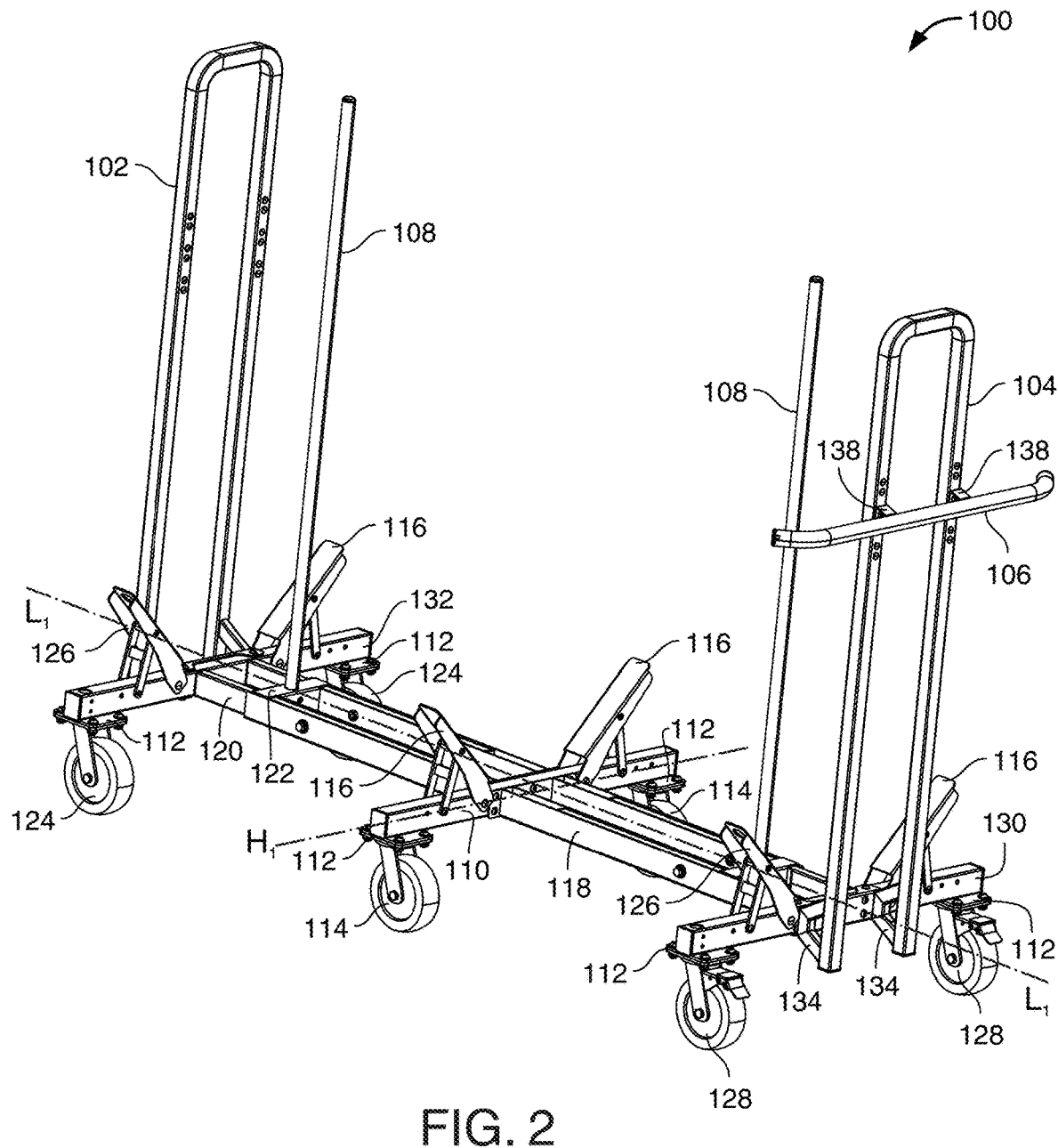
FIG. 2 shows another illustrative apparatus in accordance with principles of this matter.

FIG. 2 shows an illustrative apparatus in accordance with the principles of the disclosure. FIG. 2 shows multi-purpose dolly 100. Multi-purpose dolly 100 may include longitudinal axis Li and horizontal axis H1 to be used as a frame of reference. Li may be orthogonal to H1.

Figure 3:
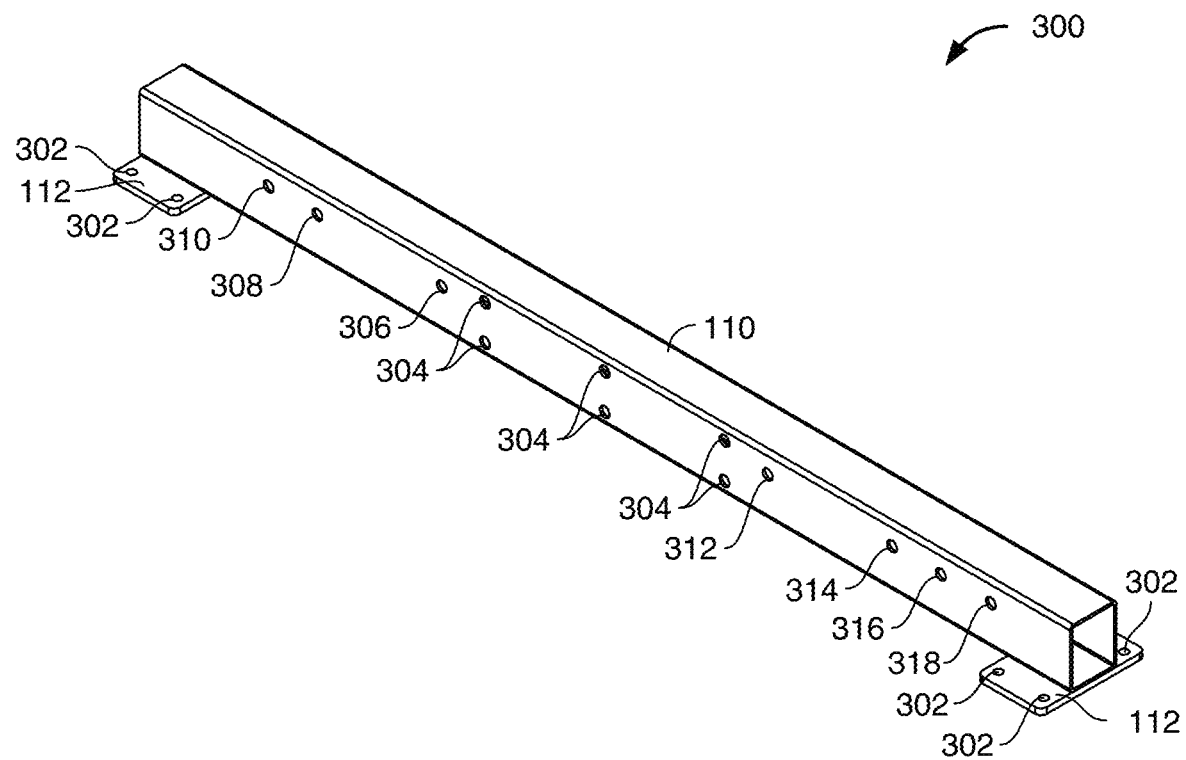
FIG. 3 shows yet another illustrative apparatus in accordance with principles of this matter.

FIG. 3 shows an illustrative apparatus in accordance with the principles of the disclosure. Apparatus 300 is middle support bar assembly as shown FIGS. 1 and 2 and described in the portion of the specification corresponding thereto. Middle support bar assembly 300 may form a center of the center frame assembly. Middle support bar assembly 300 may form the center of multi-purpose dolly 100. The center may be determined with respect to Li and H1.

Middle support bar assembly may include middle support bar 110 and two caster mounting plates 112. Caster mounting plates 112 may include four apertures or any other suitable number of apertures. The apertures may be apertures 302. Apertures 302 may be used to mount the swivel casters to the middle support assembly, as shown in FIGS. 1 and 2 and described in the portion of the specification corresponding thereto.

There may be four, or any other suitable number of sides of middle support bar 110. The four sides may include a top side, a first side (not shown), a bottom side (not shown) and a second side. Caster mounting plates 112 may preferably be mounted to the bottom side of middle support bar 110.

Middle support bar 110 may include a plurality of apertures. The plurality of apertures may be on the first side and the second side of middle support bar 110. The plurality of apertures may be shown on the second side. The plurality of apertures shown on the second side may preferably mirror the apertures on the first side. The plurality of apertures may include apertures 304, 306, 308, 310, 312, 314, 316 and 318.

Apertures 304 may include a plurality of apertures. Apertures 304 may include six apertures or any other suitable number of apertures. Apertures 304 may be used to mount the crossbar mounting plates to middle support bar 110. The first crossbar mounting plate may preferably be mounted to the first side of middle support bar 110. The second crossbar mounting plate may preferably be mounted to the second side of the middle support bar 110. The first and second crossbar mounting plates may include six apertures, or any other suitable number of apertures. The six apertures may correspond to apertures 304 on the first side and the second side of middle support bar 110.

Apertures 304 on the first side and the six apertures in the first crossbar mounting plate may be used to mount the first crossbar mounting plate to the first side of the middle support bar 110. Apertures 304 on the second side and the six apertures in the second crossbar mounting plate may be used to mount the second crossbar mounting plate to the second side of the middle support bar 110.

The middle support assembly may include two, or any other suitable number of angle support assemblies, not shown in FIG. 3. The two angle support assemblies may be rotatably coupled to middle support bar 110. A first angle support assembly may be rotatably coupled to a first portion of middle support bar 110. A second angle support assembly may be rotatably coupled to a second portion of middle support bar 110.

The angle support assemblies may be rotatably coupled to middle support bar 110 using screws. The screws may be fastened through the angle support assemblies and one or more apertures in middle support bar 110.

Each of the angle support assemblies may include an angle support and an angle support locking assembly. The angle support may include two apertures or any other suitable number of apertures. The apertures may be used to mount the angle support to the first side and/or the second side of middle support bar 110. The angle support locking assembly may also include two apertures or any other suitable number of apertures. The apertures may be used to mount the angle support locking assemblies to the first side and the second side of middle support bar 110.

The first angle support assembly may preferably be mounted to the first portion of middle support bar 110. A rivet may be fastened through the apertures in the angle support and through aperture 306. The rivet may fixedly mount the angle support to middle support bar 110.

The angle support locking assembly may be removably mounted to middle support bar 110. Middle support bar 110 may include apertures 308 and 310. Apertures 308 and 310 may be used to mount the angle support locking assembly to the middle support bar. In some embodiments, a screw may be fastened through the angle support locking assembly and through aperture 308. In other embodiments, a screw may be fastened through the angle support locking assembly and through aperture 310. In either embodiment, the screw may be removable.

In an embodiment where aperture 308 is used, the angle support assembly may be mounted to middle support bar 110 at a 135° angle. In such an embodiment, the furniture may be placed on the multi-purpose dolly at a 135° angle. Alternatively, aperture 310 may be used. In such an embodiment, the angle support assembly may be mounted at a 142° angle. The furniture may be placed on the multi-purpose dolly at an 142° angle.

The second angle support assembly may be mounted to the second portion of middle support bar 110. A rivet may be fastened through the apertures in the angle support and through aperture 312. The rivet may fixedly mount the angle support to middle support bar 110.

The angle support locking assembly may be removably mounted to middle support bar 110. There may be three, or any other suitable number of apertures for mounting the angle support locking assembly to middle support bar 110. The three apertures may include apertures 314, 316 and 318.

It should be noted that the middle support bar, the first end extension support bar and the second end extension support bar may include two portions. There may be a first portion and a second portion. The first portion may include three, or any other suitable number of apertures used for mounting the angle support assembly to the middle support bar. The second portion may include two, or any other suitable number of apertures used for mounting the angle support assembly to the middle support bar. In some embodiments, the second portion of the middle support bar may include three, or any other suitable number of apertures.

In some embodiments, a screw may be fastened through the angle support locking assembly and through aperture 314. As such, the angle support assembly may preferably be mounted to middle support bar 110 at a 135° angle. In such an embodiment, the furniture may be placed on multi-purpose dolly 100 at a 135° angle.

In other embodiments, a screw may be fastened through the angle support locking assembly and through aperture 316. As such, the angle support assembly may be mounted to middle support bar 110 at a 142° angle. In such an embodiment, the furniture may be placed on multi-purpose dolly 100 at a 142° angle.

In still other embodiments, a screw may be fastened through the angle support locking assembly and through aperture 318. As such, the angle support assembly may preferably be mounted to middle support bar 110 at a 152° angle. In such an embodiment, the furniture may be placed on multi-purpose dolly at a 152° angle. In either of the embodiments, the screw may be removable. The screw may be fastened through any other suitable aperture.

Figure 4:
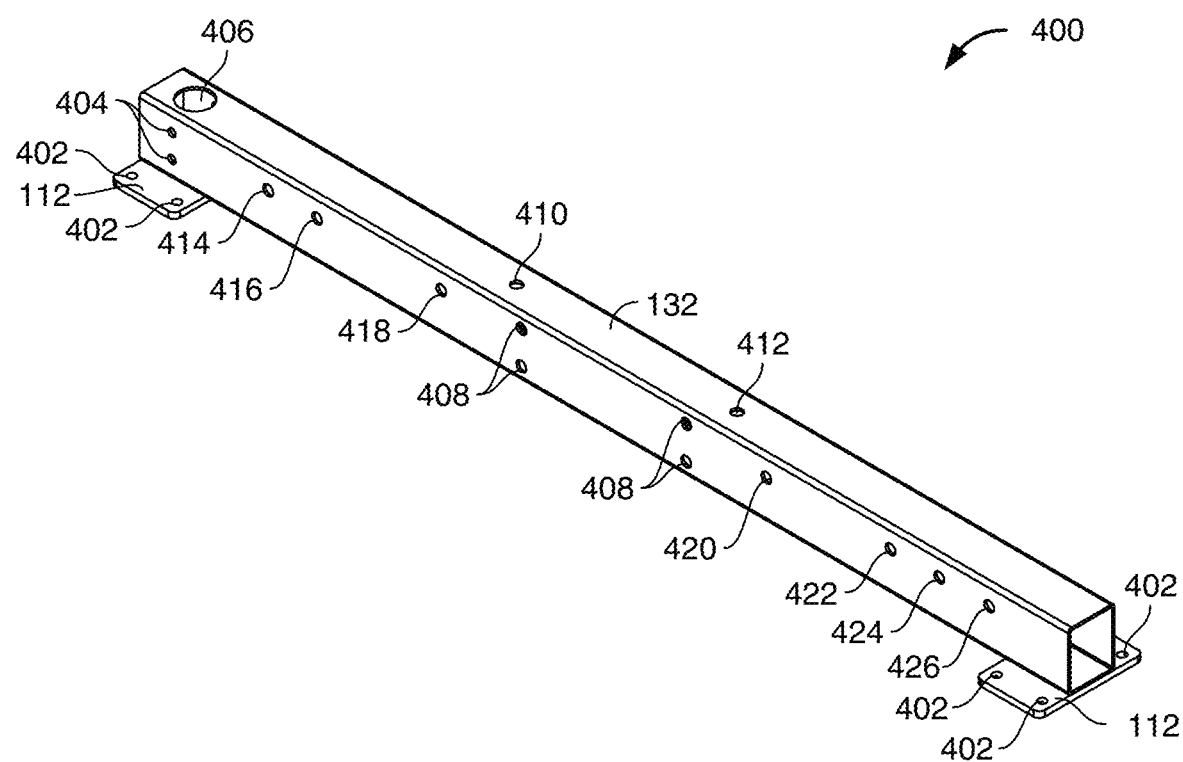
FIG. 4 shows still another illustrative apparatus in accordance with principles of this matter.

FIG. 4 shows an illustrative apparatus in accordance with the principles of the disclosure. Apparatus 400 is the second end extension support bar, as shown in FIGS. 1 and 2, and described in the portion of the specification corresponding thereto.

Second end extension support bar assembly 400 may form a part of the second end extension assembly. Second end extension support bar assembly 400 may include second end extension support bar 132 and/or two caster mounting plates 112. Each of the caster mounting plates 112 may include four apertures or any other suitable number of apertures. The four apertures may be apertures 402. Apertures 402 may be used to mount the rigid casters to the second end extension support bar assembly, as shown in FIGS. 1 and 2 and described in the portion of the specification corresponding thereto.

Second end extension support bar 132 may be parallel to middle support bar 110. There may be four sides of second end extension support bar 132. The four sides may include a top side, a first side (not shown), a bottom side (not shown) and a second side. Caster mounting plates 112 may preferably be mounted to the bottom side.

Second end extension support bar 132 may include a plurality of apertures. The plurality of apertures may be on the top side, the first side and the second side. The apertures shown on the first side may preferably mirror the apertures on the second side. The plurality of apertures may include apertures 404, 408, 410, 412, 414, 416, 418, 420, 422, 424 and 426.

There may be a hole in second end extension support bar 132. The hole may be hole 406. Hole 406 may be one of the holes that holds a support tube, as shown in FIGS. 1 and 2, and described in the portion of the specification corresponding thereto. In an embodiment where the support tube is fixedly located in hole 406, apertures 404 may be used to mount a support tube to second end extension support bar 132.

Second end extension support bar assembly 400 may include two angle support assemblies, not shown in FIG. 4. One of the angle support assemblies may be an angle support assembly with a hole. Each of the angle support assemblies may be rotatably coupled to second end extension support bar 132.

Each of the angle support assemblies may be coupled to second end extension support bar 132 using screws. The screws may be fastened through the angle support assemblies and the apertures in second end extension support bar 132.

Each of the angle support assemblies may include an angle support and an angle support bracket. For purposes of the application, the angle support bracket may also be referred to as the angle support locking assembly. The angle support may include two apertures for mounting to second end extension support bar 132. The angle support bracket may include two apertures for mounting to second end extension support bar 132.

The angle support assembly with the hole may be coupled to the portion of second end extension support bar 132 that has a hole. A rivet may be fastened through the apertures in the angle support and through aperture 418. The rivet may fixedly mount the angle support to second end extension support bar 132.

The angle support brackets may be removably mounted to second end extension support bar 132. There may be two, or any other suitable number of apertures to mount to second end extension support bar 132. The two apertures may include apertures 414 and 416.

In some embodiments, a screw may be fastened through the angle support bracket and through aperture 416. The angle support bracket may preferably be mounted to second end extension support bar 132 at a 135° angle. In such an embodiment, the furniture may be placed on multi-purpose dolly 100 at a 135° angle.

In other embodiments, a screw may be fastened through the angle support bracket and through aperture 414. The angle support bracket may preferably be mounted to the second end extension support bar at a 142° angle. In such an embodiment, the furniture may be placed on multi-purpose dolly 100 at a 142° angle. In either of the embodiments, the screw may be removable. The screw may be fastened through any other suitable aperture.

The second angle support assembly may be coupled to a second portion of second end extension support bar 132. A rivet may be fastened through the apertures in the angle support and through aperture 420. The rivet may fixedly mount the angle support to second end extension support bar 132.

The angle support brackets may be removably mounted to second end extension support bar 132. There may be three, or any other suitable number of apertures used to mount the angle support brackets to second end extension support bar 132. The three apertures may be apertures 422, 424 and 426.

In some embodiments, a screw may be fastened through the angle support bracket and through aperture 422. The angle support bracket may preferably be mounted to second end extension support bar 132 at a 135° angle. In such an embodiment, the furniture may be placed on multi-purpose dolly 100 at a 135° angle.

In other embodiments, a screw may be fastened through the angle support bracket and through aperture 424. The angle support bracket may preferably be mounted to second end extension support bar 132 at a 142° angle. In such an embodiment, the furniture may be placed on multi-purpose dolly 100 at a 142° angle.

In other embodiments, a screw may be fastened through the angle support bracket and through aperture 426. The angle support bracket may preferably be mounted to second end extension support bar 132 at a 152° angle. In such an embodiment, the furniture may be placed on multi-purpose dolly 100 at a 152° angle. In either of the embodiments, the screw may be removable. The screw may be fastened through a second aperture. Second end extension support bar assembly 400 may be substantially equivalent to the first end extension support bar assembly.

Figure 5:
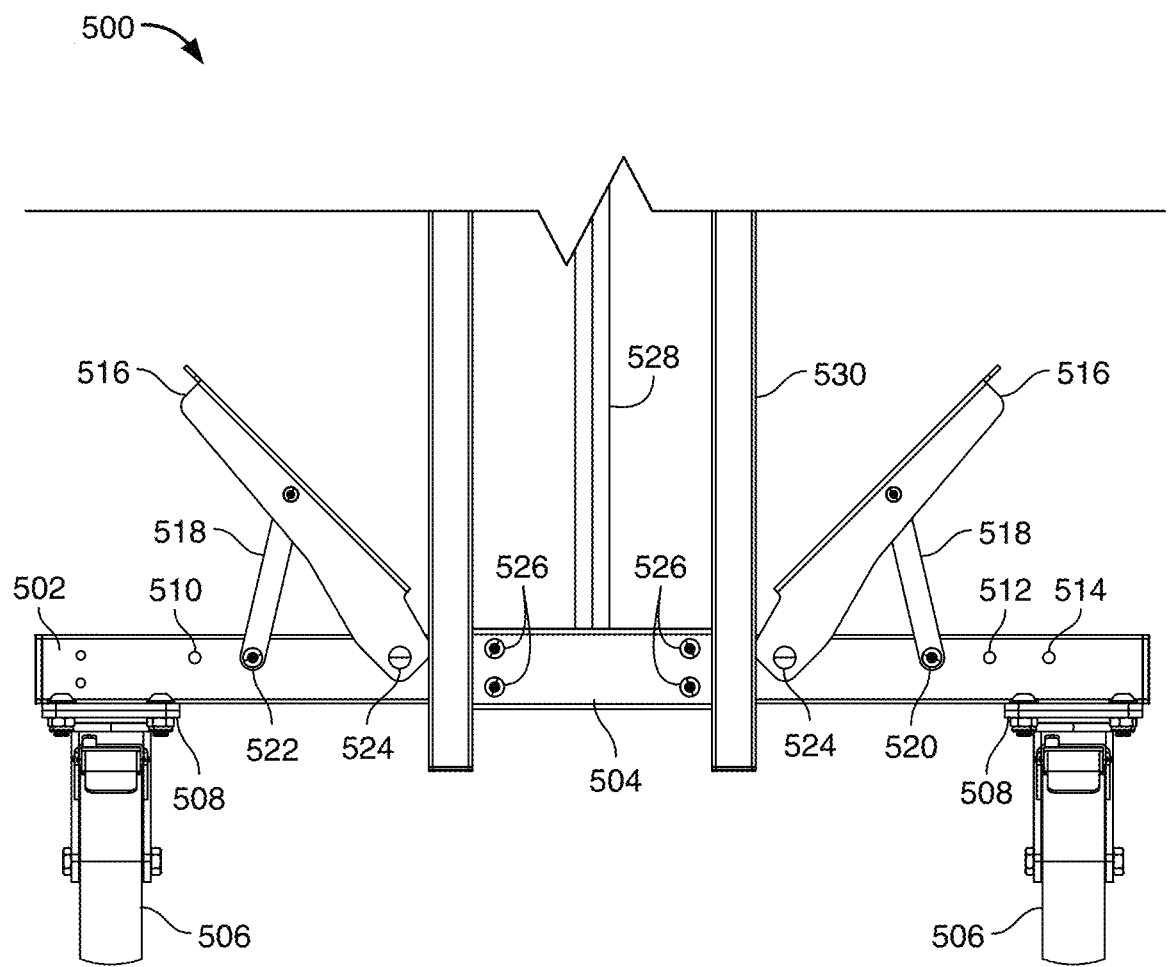
FIG. 5 shows a portion of the illustrative apparatus in accordance with principles of this matter.

FIG. 5 shows a portion of multi-purpose dolly 100. The portion of multi-purpose dolly 100 is a portion of the first end extension assembly 500. First end extension assembly 500 may include first end extension support bar 502. First end extension support bar 502 may directly relate to first end extension support bar 130, as shown in FIG. 1.

First end extension assembly 500 may include two angle support assemblies or any other suitable number of angle support assembly. The angle support assemblies may directly relate to angle support assemblies 116 and angle support assemblies 126, as shown in FIG. 1 and described in the portion of the specification corresponding thereto. The angle support assemblies may be rotatably coupled to first end extension support bar 502. The angle support assemblies may include angle support 516 and angle support locking assembly 518. Angle support 516 may be fixedly mounted to first end extension support bar 502. Angle support 516 may be fixedly mounted by threading rivet 524 through angle support 516 and apertures (not shown). The angle support locking assembly 518 may include apertures for mounting to first end extension support bar 502.

There may be four, or any other suitable number of apertures on the angle support assembly. Two of the four apertures may be located on angle support 516. Two of the apertures may be located on angle support locking assembly 518. Each of the four apertures may be used to rotatably couple the angle support assembly to first end extension support bar 502.

A first of the angle support assemblies may be rotatably coupled to a first portion of first end extension support bar 502. The first portion may be located after a first leg of handlebar 530. Angle support 516 may include two apertures or any other suitable number of apertures. There may be a first aperture on a first side of angle support 516. There may be a second aperture on a second side of angle support 516. The location of the aperture on the first side may preferably mirror the location of the aperture on the second side. Rivet 524 may be fastened through each of the two apertures and through first end extension support bar 502. Rivet 524 may fixedly mount angle support 516 to first end extension support bar 502.

The first angle support assembly may include angle support locking assembly 518. There may be an aperture on the first side of angle support locking assembly 518. There may be an aperture on the second side of angles support locking assembly 518. The location of the aperture on the first side may preferably mirror the location of the aperture on the second side. There may be multiple apertures, including apertures 510 or any other suitable apertures, within first end extension support bar 502 for attachment to angle support locking assembly 518. Each of the multiple apertures may place angle support 516 on different angle when mounting the angle support locking assembly 518 to first end extension support bar 502.

The multiple apertures may include apertures 520, 512 and 514. In the embodiment shown, aperture 520 may be engaged. Aperture 520 may be engaged to rotatably couple angle support locking assembly 518 to first end extension support bar 502. A screw may be engaged through angle support locking assembly 518, first end extension support bar 502 and the second side of angle support locking assembly 518. Angle support locking assembly 518 may be fastened to first end extension support bar 502 on or about a 135° angle.

In an embodiment where aperture 512 is used, the angle support assembly may be alternatively mounted on a 142° angle. In other embodiments, the angle support assembly may be alternatively mounted to aperture 514 on a 152° angle.

In certain embodiments, angle support 516 may lay flush with support bar 502. As such, angle support locking assembly 518 may not be coupled to apertures (such as apertures 520, 514 and 512) within bar 502. Such an embodiment may be used when stacking furniture in a horizontal manner such as those shown in FIG. 18.

The second angle support assembly may be rotatably coupled to a second portion of first end extension support bar 502. The second portion of first end extension support bar 502 may be located directly adjacent to second side of handlebar 530. Angle support 516 may include two apertures or any other suitable number of apertures. A first aperture may be on a first side of angle support 516. A second aperture may be on a second side of angle support 516. The location of the aperture on the first side may preferably mirror the location of the aperture on the second side of handlebar 530. Rivet 524 may be fastened through the two apertures and first end extension support bar 502. Rivet 524 may fixedly mount angle support 516 to first end extension support bar 502.

The second angle support assembly may include angle support locking assembly 518. Angle support locking assembly 518 may include an aperture on a first side of the angle support locking assembly. Angle support locking assembly 518 may include an aperture on a second side of the angle support locking assembly. The location of the aperture on the first side may preferably mirror the location of the aperture on the second side. There may be multiple apertures within first end extension support bar 502. The apertures may be used to mount angle support locking assembly 518 to first end extension support bar 502. Each of the multiple apertures may provide a different angle when mounting the angle support locking assembly 518 to first end extension support bar 502.

The multiple apertures may include apertures 522 and 510. In the embodiment shown, aperture 522 may be used. Angle support locking assembly 518 may be rotatably coupled to first end extension support bar 502 using aperture 522. A screw may be fastened through angle support locking assembly 518, first end extension support bar 502 and through the second side of angle support locking assembly 518. As such, angle support locking assembly 518 may be fastened to first end extension support bar on a 135° angle. In other embodiments, the angle support assembly may be alternatively mounted to aperture 510. In such embodiments, the angle support assembly may be attached on a 142° angle.

Handlebar 530 may be mounted to first end extension support bar 502. Handlebar 530 may be a fixed handlebar. Handlebar 530 may be a removable handlebar. There may be a handlebar support attachment assembly for attaching handlebar 530 to first end extension support bar 502.

The handlebar support attachment assembly may include handle frame support 504. Handle frame support 504 may directly relate to handle frame support 136, as shown in FIG. 1 and described in the portion of the specification corresponding thereto. Aperture 526 may be used to mount handle frame support 504 to first end extension support bar 502.

First end extension assembly 500 may include a plurality of lock swivel casters 506. There may be two, or any other suitable number of lock swivel casters 506. Lock swivel casters 506 may include a wheel and/or a sheet of metal. The sheet of metal may be used to mount lock swivel casters 506 to the first end extension assembly 500.

First end extension assembly 500 may include two, or any other suitable number of caster mounting plates 508. Caster mounting plates 508 may directly relate to caster mounting plates 112, as shown in FIG. 1, and described in the portion of the specification corresponding thereto. Caster mounting plates 508 may be welded, coupled and/or using any suitable connector method to first end extension support bar 502. Caster mounting plates 508 may include a plurality of apertures. The sheet metal of lock swivel casters 506 may include a plurality of apertures. A screw may be fastened through each of the apertures in lock swivel casters 506 and the caster mounting plates 508. The screws may be used to mount lock swivel casters 506 to caster mounting plates 508.

First end extension assembly 500 may include support tube 528. Support tube 528 may directly relate to support tube 108, as shown in FIG. 1, and described in the portion of the specification corresponding thereto.

Figure 5A:
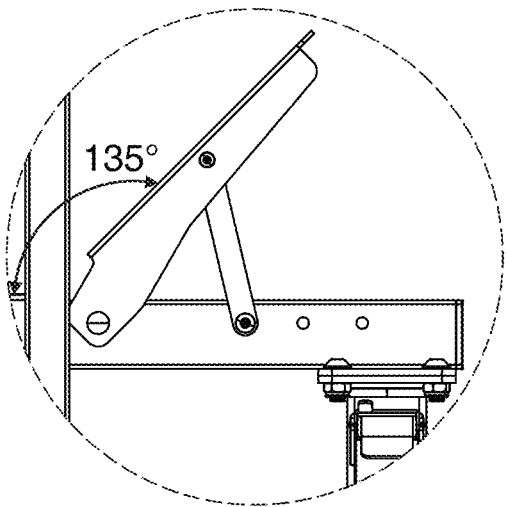
FIG. 5A-D shows a portion of the illustrative apparatus in accordance with principles of this matter.

FIG. 5A shows angle support assembly 516 attached to first end extension support bar 502. The angle support assemblies may be adjustable within the angle support apertures. As such, there may be a plurality of ranging angles at which the dolly may hold the furniture. For purposes of the application, each angle support assembly rotatably coupled to a support bar may form an acute and obtuse angle. The obtuse angle may be with respect to a meeting point between the angle support assemblies and the support bar. The plurality of angles at which the multi-purpose dolly may be held may include on or about 135°, 142°, 152° or any other suitable obtuse angles.

It should be noted that the angle support assemblies shown in FIGS. 5A to 5D are mounted to a first portion of the first end extension bar. However, the angle support assemblies may be mounted to a first portion of the middle support bar and/or a second end extension support bar. It should be further noted that the angle support assemblies may be mounted to a second portion of the first end extension support bar, middle support bar and/or second end extension support bar.

In some embodiments the angle support assemblies may be mounted to the support bars on the second portion of the support bars. The second portion of the support bars may include a hole for placement of the support tubes. As such, the second portion of the support bars may include two apertures instead of three apertures or any other suitable number of apertures. In such embodiments, the angles may be mounted to the support bars at a 135°, 142° or any other suitable angle.

FIG. 5A shows angle support assembly 516 mounted to first end extension support bar 502 using aperture 520. Angle support assembly 516 may be mounted to first end extension support bar on a 135° angle.

Figure 5B:
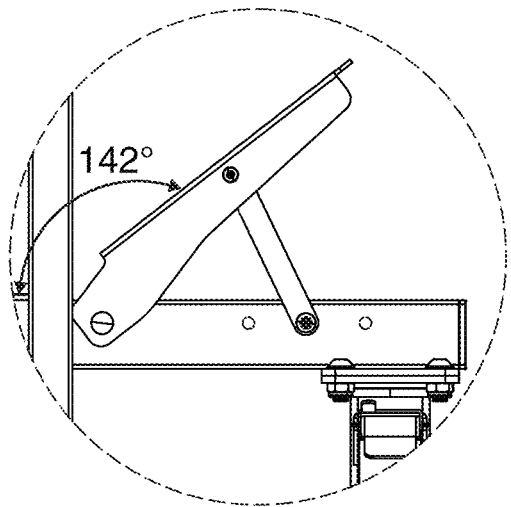
Figure 5C:
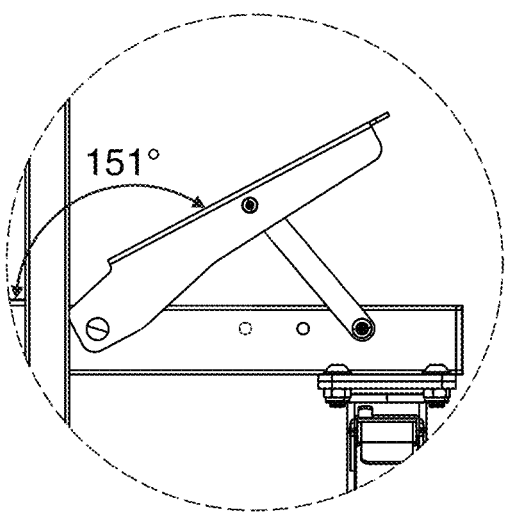

FIG. 5B shows angle support assembly 516 mounted to first end extension support bar 502 using aperture 512. Angle support assembly 516 may be mounted to first end extension support bar on 142° angle FIG. 5C shows angle support assembly 516 mounted to first end extension support bar 502 using aperture 514. Angle support assembly 516 may be mounted to first end extension support bar on a 152° angle.

Figure 5D:
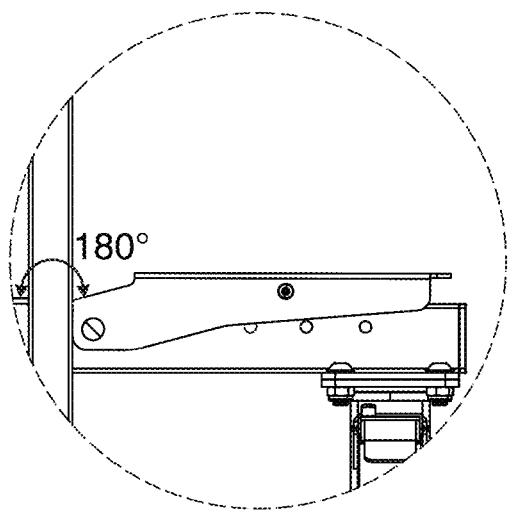

FIG. 5D shows angle support locking assembly 518 not mounted to first end extension support bar 502. Angle support assembly may lay flush with first end extension support bar 502. Angle support assembly 516 may be mounted to first end extension support bar on a 180° angle. Such an embodiment may be used when transporting furniture in a flat position using the multi-purpose dolly.

Figure 6:
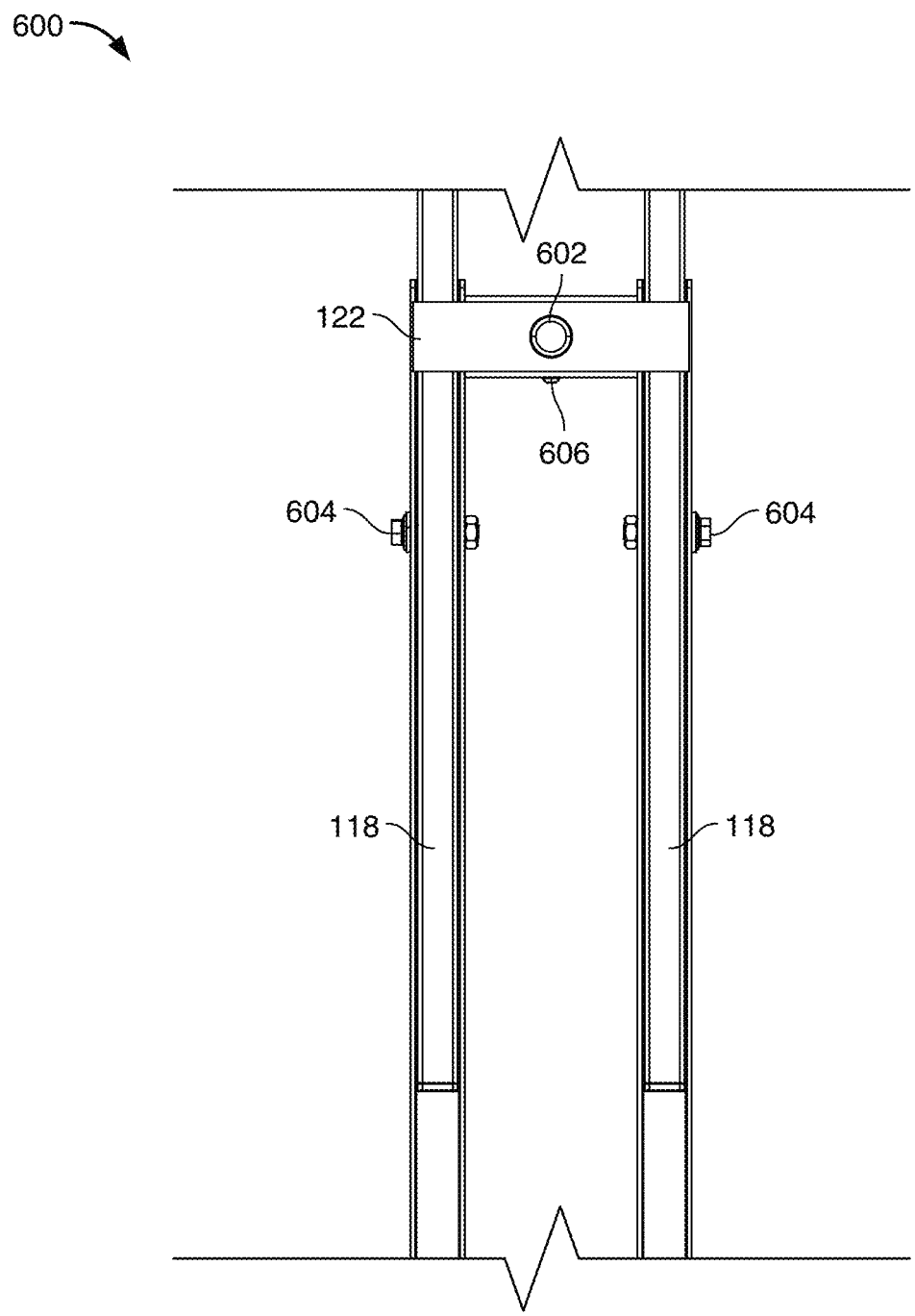
FIG. 6 shows another portion illustrative apparatus in accordance with principles of this matter.

FIG. 6 shows an illustrative apparatus in accordance with the principles of the disclosure. Apparatus 600 is a portion of multi-purpose dolly 100, as shown in FIG. 1, and described in the portion of the specification corresponding thereto. Apparatus 600 may be a portion of the center frame assembly. Apparatus 600 may be the first middle frame assembly. Apparatus 600 may be the second middle frame assembly. Apparatus 600 may include crossbar channels 118, as shown in FIG. 1 and described in the portion of the specification corresponding thereto. There may be two, or any other suitable number of crossbar channels 118 in apparatus 600. Crossbar channels 118 may connect the center frame assembly to the first and second end extension assemblies.

Apparatus 600, or first and second middle frame assemblies 600, may include screws 604. Screws 604 may be fastened through the apertures located within crossbar channels 118. Screws 604 may be used to facilitate mounting first or second end extension tubes to crossbar channels 118. As such, the end extension assemblies may be mounted to the center frame assembly.

First or second middle frame assemblies 600 may include hole 602. Hole 602 may be located on middle connection 122, as shown in FIG. 1 and described in the portion of the specification corresponding thereto. Hole 602 may be a hole for placement of the support tubes. In some embodiments, the support tubes may be fixedly located in hole 602. In other embodiments, the support tubes may be fixedly located in other holes within the multi-purpose dolly. In yet other embodiments, the support tubes may be absent from the multi-purpose dolly.

First or second middle frame assemblies 600 may include screw 606. In an embodiment where the support tube is fixedly located within hole 602, screw 606 may be fastened through an aperture within middle connection 122. Screw 606 may be used to facilitate mounting the support tube to the multi-purpose dolly. As such, screw 606 may secure the support tubes to middle connection 122.

Figure 7:
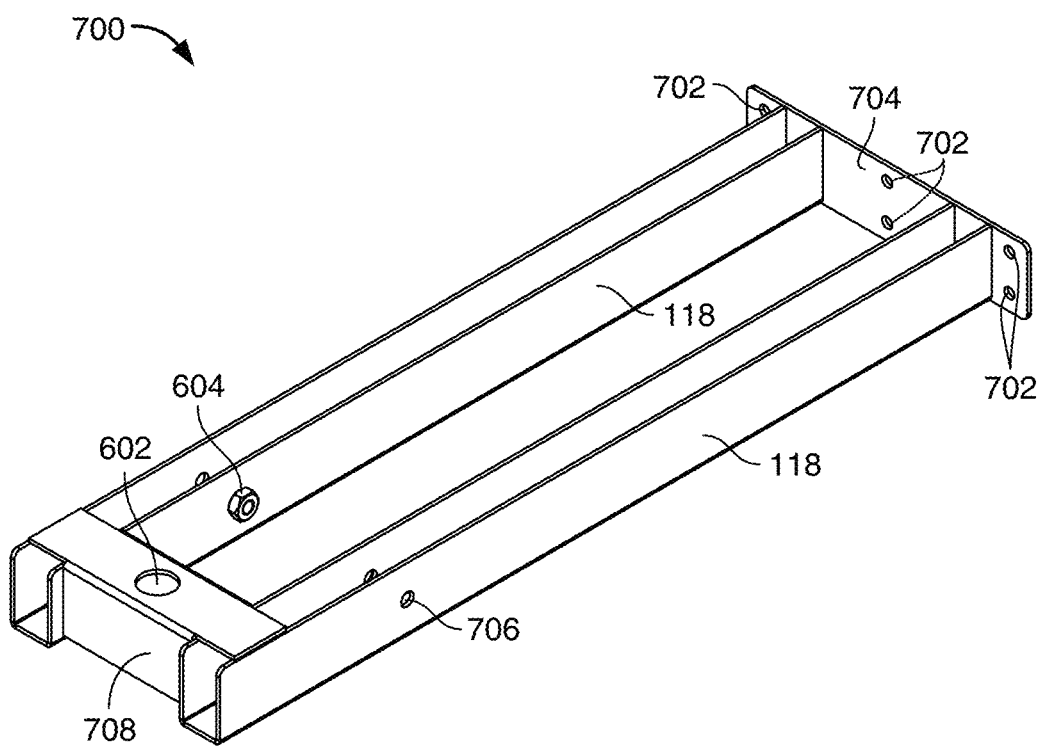
FIG. 7 shows an illustrative apparatus in accordance with principles of this matter.

FIG. 7 shows an illustrative apparatus in accordance with the principles of the disclosure. Apparatus 700 may be a first middle frame assembly without surrounding components. Apparatus 700 may be a second middle frame assembly without surrounding components. Apparatus 700 includes crossbar channels 118, hole 602, screw 604, crossbar mounting plate 704, apertures 702, aperture 706 and/or middle connection 708. Middle connection 708 may directly relate to middle connection 122, as shown in FIGS. 1 and 6, and described in the portion of the specification corresponding thereto. Screw 604, as shown and described in FIG. 6, may be fastened through aperture 706 in crossbar channels 118.

Crossbar mounting plate 704 may include a plurality of apertures 702. Plurality of apertures 702 may match a plurality of apertures in the middle support bar, as shown in FIG. 3 and described in the portion of the specification corresponding thereto. The plurality of apertures 702 may be used to mount apparatus 700 to the middle support bar. As such, the center frame assembly may be formed. Crossbar channels 118 may preferably be mounted to crossbar mounting plate 704.

Figure 8:
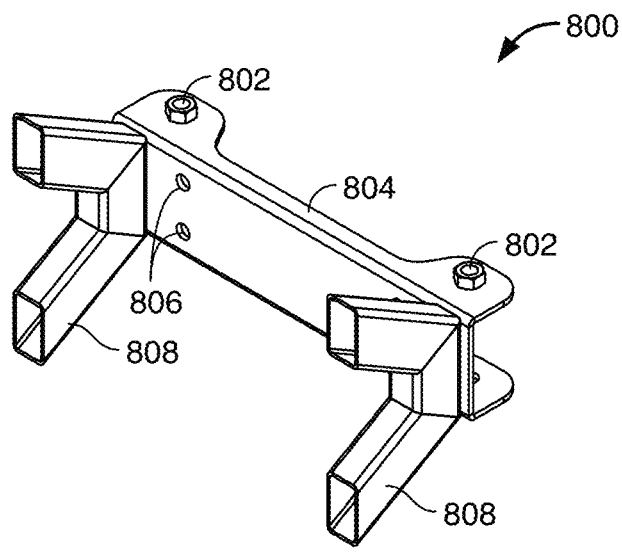
FIG. 8 shows another illustrative apparatus in accordance with principles of this matter.

FIG. 8 shows an illustrative apparatus in accordance with the principles of the disclosure. Apparatus 800 is a handle frame attachment support assembly. Handle frame attachment support assembly 800 may be used to mount both the removable handlebar and/or the fixed handlebar to the multi-purpose dolly.

Handle frame attachment support assembly 800 may include hexagon nuts 802, handle frame support 804, apertures 806 and/or handle frame attachment 808. Handle frame attachment support assembly 800 may be mounted to the first end extension support bar. Handle frame attachment support assembly 800 may be mounted to the second end extension support bar. Handle frame attachment support assembly 800 may be mounted to each extension support bar using hexagon nut 802 and/or apertures 806.

Hexagon nuts 802 may be used to mount the handle frame attachment support assembly to the top side and bottom side of the extension support bars. Apertures 806 may be used with a screw to mount to a first or second side of the extension support bars. Handle frame attachment 808 may preferably be mounted to the end extension support bars. Handle frame supports 804 may be welded to handle frame attachment 808.

Figure 9:
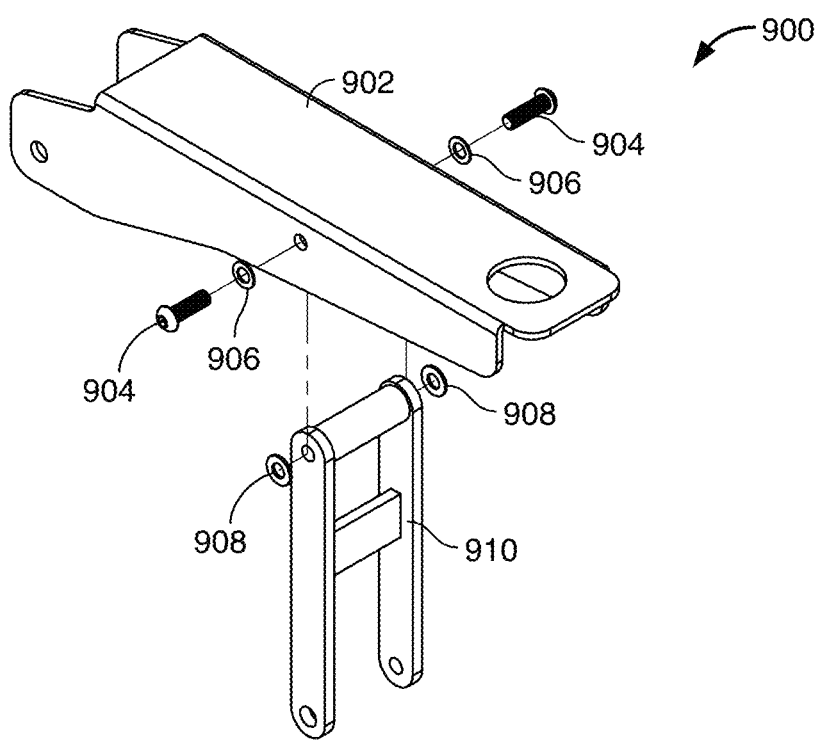
FIG. 9 shows yet another illustrative apparatus in accordance with principles of this matter.

FIG. 9 shows an illustrative apparatus in accordance with the principles of the disclosure. FIG. 9 shows an exploded view of angle support assembly 900. Angle support assembly 900 may be an angle support assembly with a hole. Angle support assembly 900 with hole may directly relate to angle support assembly 126, as shown in FIG. 1 and described in the portion of the specification corresponding thereto.

Angle support assembly 900 with hole may include angle support 902, screws 904, washers 906, washers 908 and/or angle support locking assembly 910. Angle support 902 may form a platform for placement and storage of the furniture. Angle support 902 may be mounted to angle support locking assembly 910.

Screws 904 may be fastened through washers 906, angle support 902, washers 908 and angle support locking assembly 910 to assemble angle support assembly 900. It should be noted that angle support locking assembly 910 may have a curved edge. The curved edge may enable angle support assembly 900 with hole to smoothly maneuver different angles.

Figure 10:
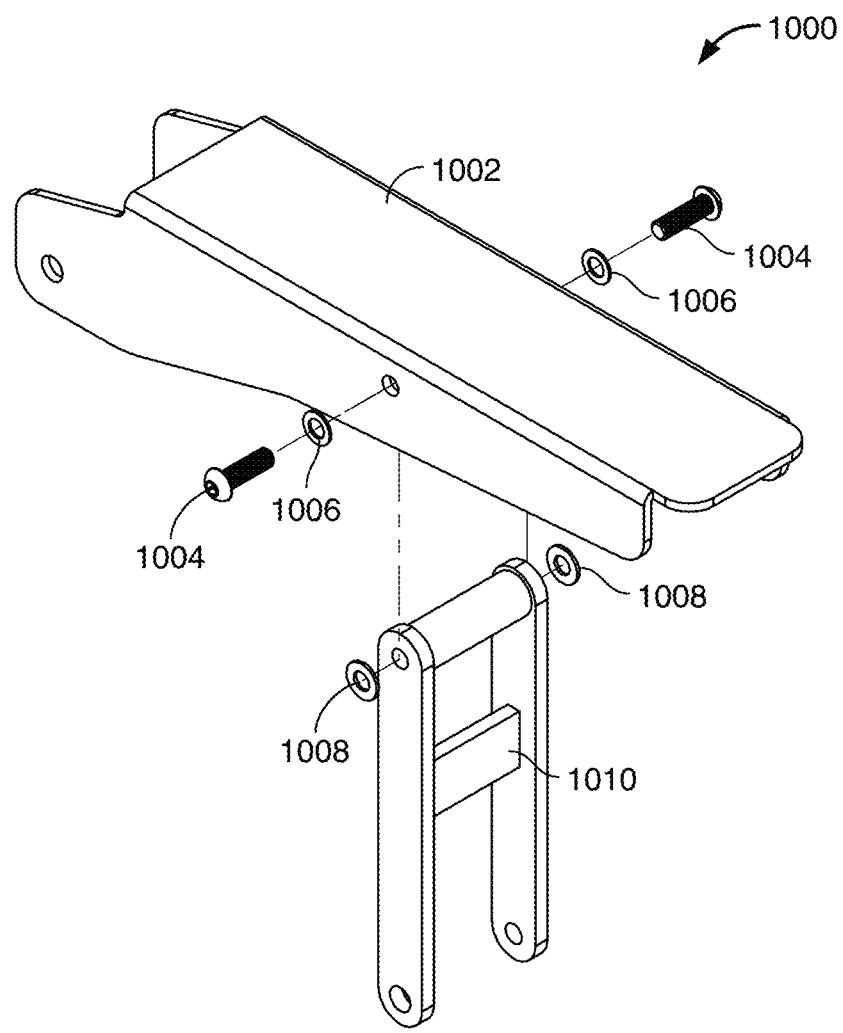
FIG. 10 shows still another illustrative apparatus in accordance with principles of this matter.

FIG. 10 shows an illustrative apparatus in accordance with the principles of the disclosure. FIG. 10 shows an exploded view of angle support assembly 1000. Angle support assembly 1000 may directly relate to angle support assembly 116, as shown in FIG. 1 and described in the portion of the specification corresponding thereto.

Angle support assembly 1000 may include angle support 1002, screws 1004, washers 1006, washers 1008 and/or angle support locking assembly 1010. Angle support 1002 may form a platform for placement and storage of the furniture. Angle support 1002 may be mounted to angle support locking assembly 1010.

Screws 1004 may be fastened through washers 1006, angle support 1002, washers 1008 and into angle support locking assembly 1010 to assemble angle support assembly 1000. It should be noted that angle support locking assembly 1010 has a curved edge. The curved edge gives angle support assembly 1000 the ability to maneuver to various angles.

Figure 11:
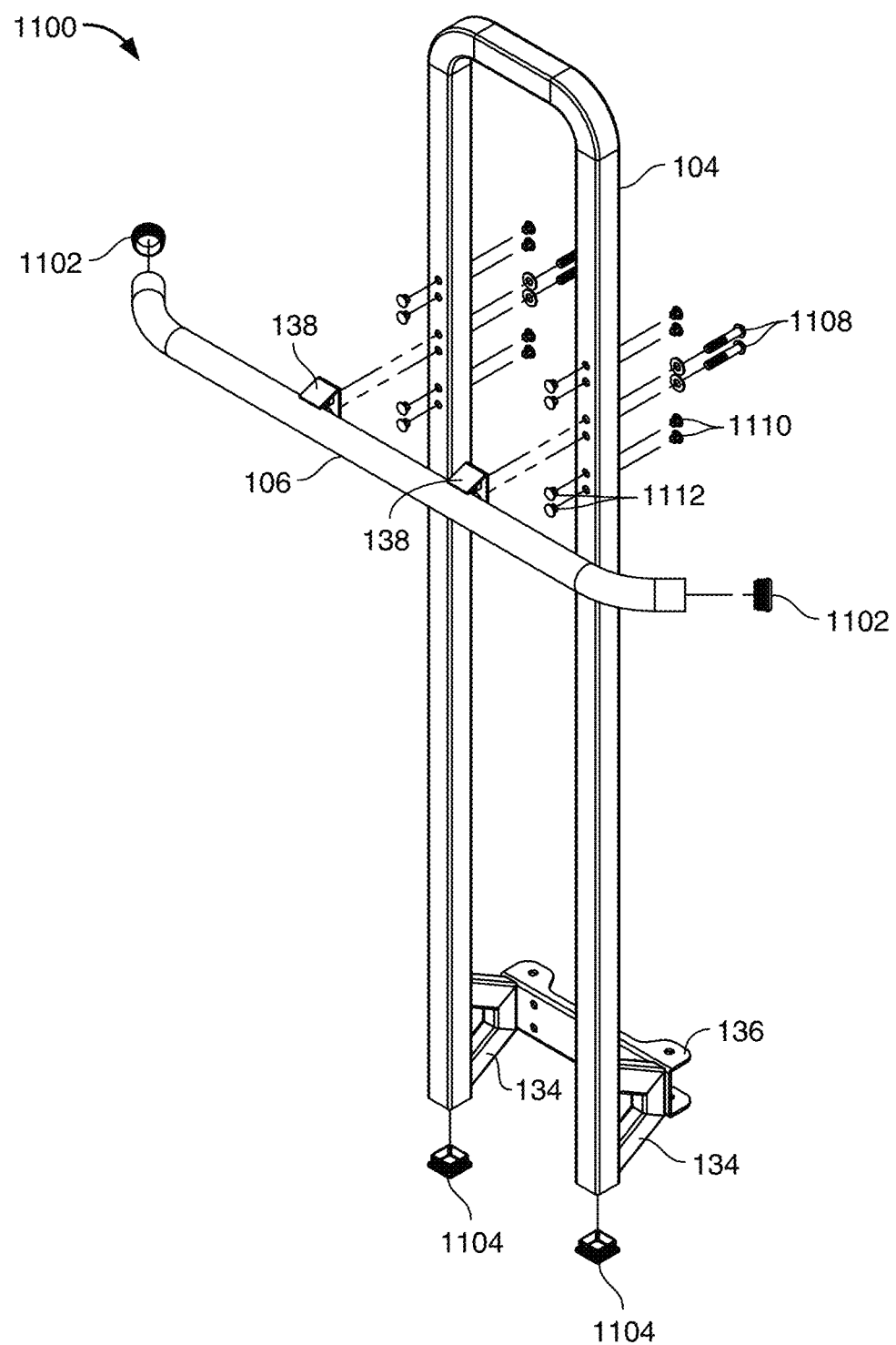
FIG. 11 shows an illustrative apparatus in accordance with principles of this matter.

FIG. 11 shows an illustrative apparatus in accordance with the principles of the disclosure. FIG. 11 shows an exploded view of handlebar assembly 1100. Handlebar assembly 1100 may be a removable handlebar. Handlebar assembly 1100 may be a fixed handlebar.

Handlebar assembly 1100 may include handlebar grip 106, handle frame attachment 134, handle frame support 136, handle bracket 138, round inserts 1102, rectangular inserts 1104, screws 1108, plug inserts 1110, hole plug 1112 and/or handlebar 1114. Round inserts 1102, rectangular inserts 1104 and plug inserts 1110 may be formed from rubber or any other suitable material. Handlebar grip 106, handle frame attachment 134, handle frame support 136, handle bracket 138 and handlebar 1114 may be formed from steel, aluminum, metal, plastic, wood or any other suitable material.

Handle frame support 136 may be mounted to handle frame attachments 134. Handle frame attachments 134 may be welded to the bottom of handlebar 1114. Handlebar 1114 may be a rectangular tube. Handlebar 1114 may have four sides or any other suitable number of sides. There may be two ends of handlebar 1114. The two ends may be closed with rectangular inserts 1104.

Handle bracket 138 may be welded to handlebar grip 106. Handlebar grip 106 may be a round tube. Handlebar grip 106 may have two open ends. The open ends may be closed with round inserts 1102. Screws 1004 may be used to mount handlebar grip 106 and/or handle bracket 138 to handlebar 1114.

There may be a plurality of apertures in handlebar 1114. There may be sets of apertures within the plurality of apertures. Each set of apertures may correspond to a different handlebar height. The height of the handlebar grip 106 may be adjustable within the plurality of apertures. Screws 1108 may be fastened through any of the plurality of apertures and into handlebar grip 106. Different apertures may be fastened in different embodiments. Hole plug 1112 may connect with plug insert 1110 through an aperture.

Figure 12:
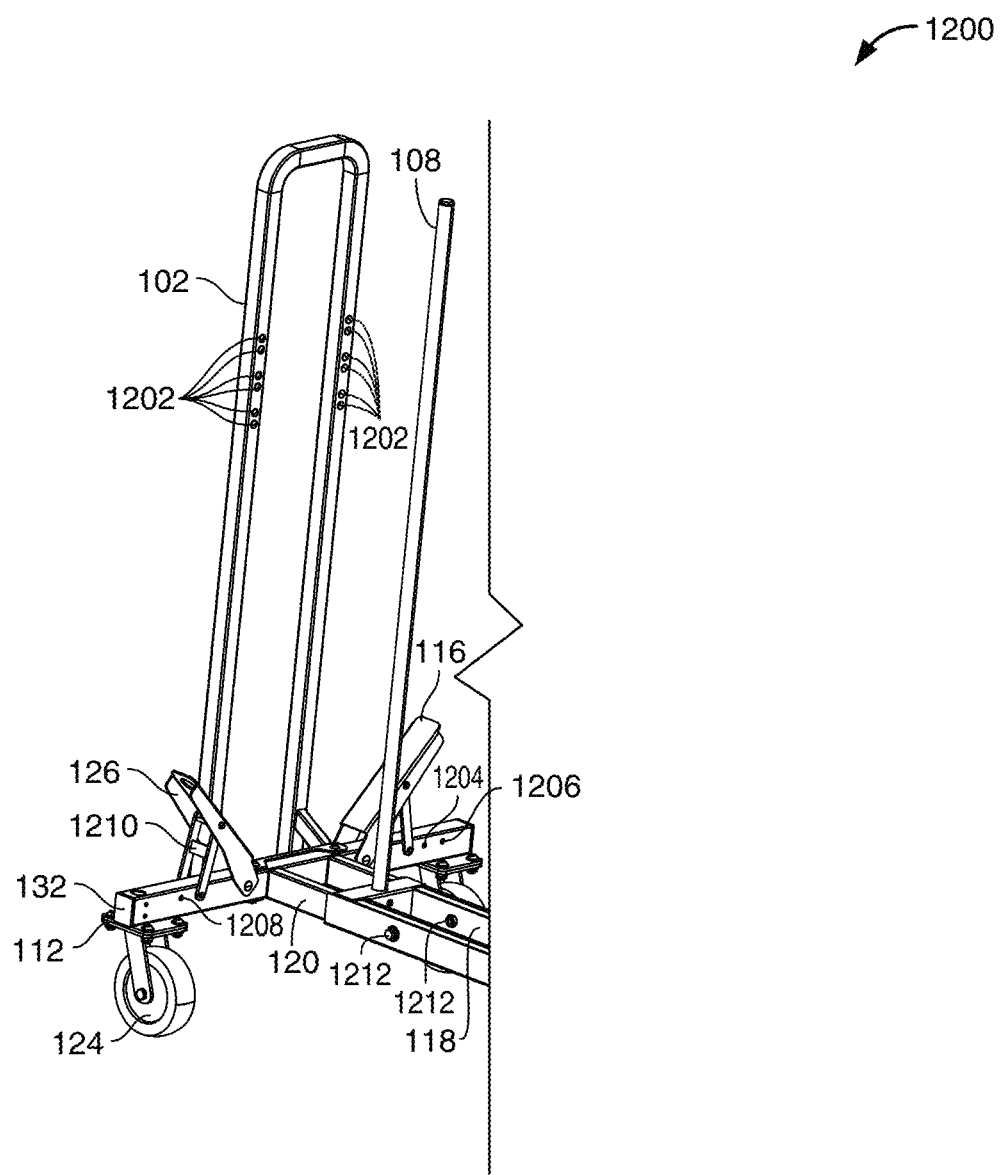
FIG. 12 shows a portion of the illustrative apparatus in accordance with principles of this matter.

FIG. 12 shows an illustrative apparatus in accordance with the principles of the disclosure. FIG. 12 shows a portion of the multi-purpose dolly. Second end extension assembly 1200 may be a portion of the multi-purpose dolly. Second end extension assembly 1200 may include removable handlebar 102, as shown in FIG. 1 and described in the portion of the specification corresponding thereto. Removable handlebar 102 may include apertures 1202. When a handlebar grip is used with removable handlebar 102, apertures 1202 may be used.

Second end extension assembly 1200 may include apertures 1204, 1206 and 1208. Apertures 1204, 1206 and 1208 may directly related to apertures 424, 426 and 414, as shown in FIG. 4 and described in the portion of the specification corresponding thereto. Second end extension assembly 1200 may include angle support locking assembly 1210. Angle support locking assembly 1210 may directly relate to angle support locking assembly 910, as shown in FIG. 9 and described in the portion of the specification corresponding thereto. Second end extension assembly 1200 may include hexagon nuts 1212. Hexagon nuts 1212 may directly relate to screws 604, as shown in FIGS. 6 and 7 and described in the portion of the specification corresponding thereto.

FIG. 13 shows an illustrative apparatus in accordance with the principles of the disclosure. FIG. 13 is a portion of the multi-purpose dolly. Center frame assembly 1300 may form the center of the multi-purpose dolly. Center frame assembly 1300 may include apertures 1302, 1304 and 1306. Apertures 1302, 1304 and 1306 may directly relate to apertures 318, 316 and 310, as shown in FIG. 3 and described in the portion of the specification corresponding thereto.

Figure 14:
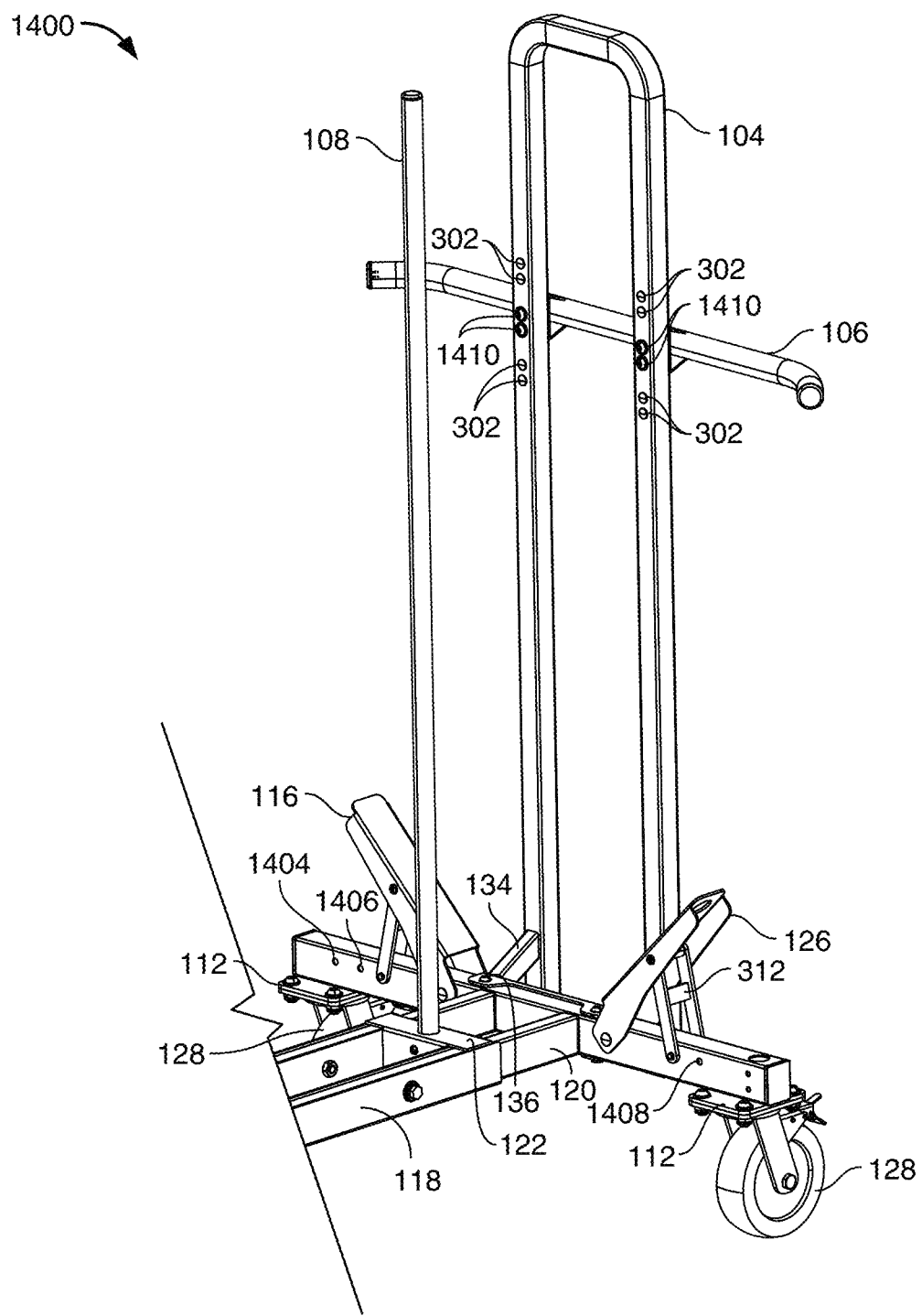
FIG. 14 shows yet another portion of the illustrative apparatus in accordance with principles of this matter.

FIG. 14 shows an illustrative apparatus in accordance with the principles of the disclosure. FIG. 14 is a portion of the multi-purpose dolly. First end extension assembly 1400 may form a portion of the multi-purpose dolly. First end extension assembly 1400 may include fixed handlebar 104, as shown in FIG. 1 and described in the portion of the specification corresponding thereto. Fixed handlebar 104 may include apertures 302, as shown in FIG. 1 and described in the portion of the specification corresponding thereto. Fixed handlebar 104 may include screws 1410.

First end extension assembly 1400 may include handlebar grip 106, as shown in FIG. 1 and described in the portion of the specification corresponding thereto. Screws 1410 may be fastened through fixed handlebar 104 and through handlebar grip 106. Screws 1410 may be used to mount handlebar grip 106 to fixed handlebar 104.

First end extension assembly 1400 may include apertures 1404, 1406 and 1408. Apertures 1404, 1406 and 1408 may directly relate to apertures 426, 424 and 414, as shown and described in FIG. 4. First end extension assembly 1400 may form a first end of the multi-purpose dolly.

Figure 15:
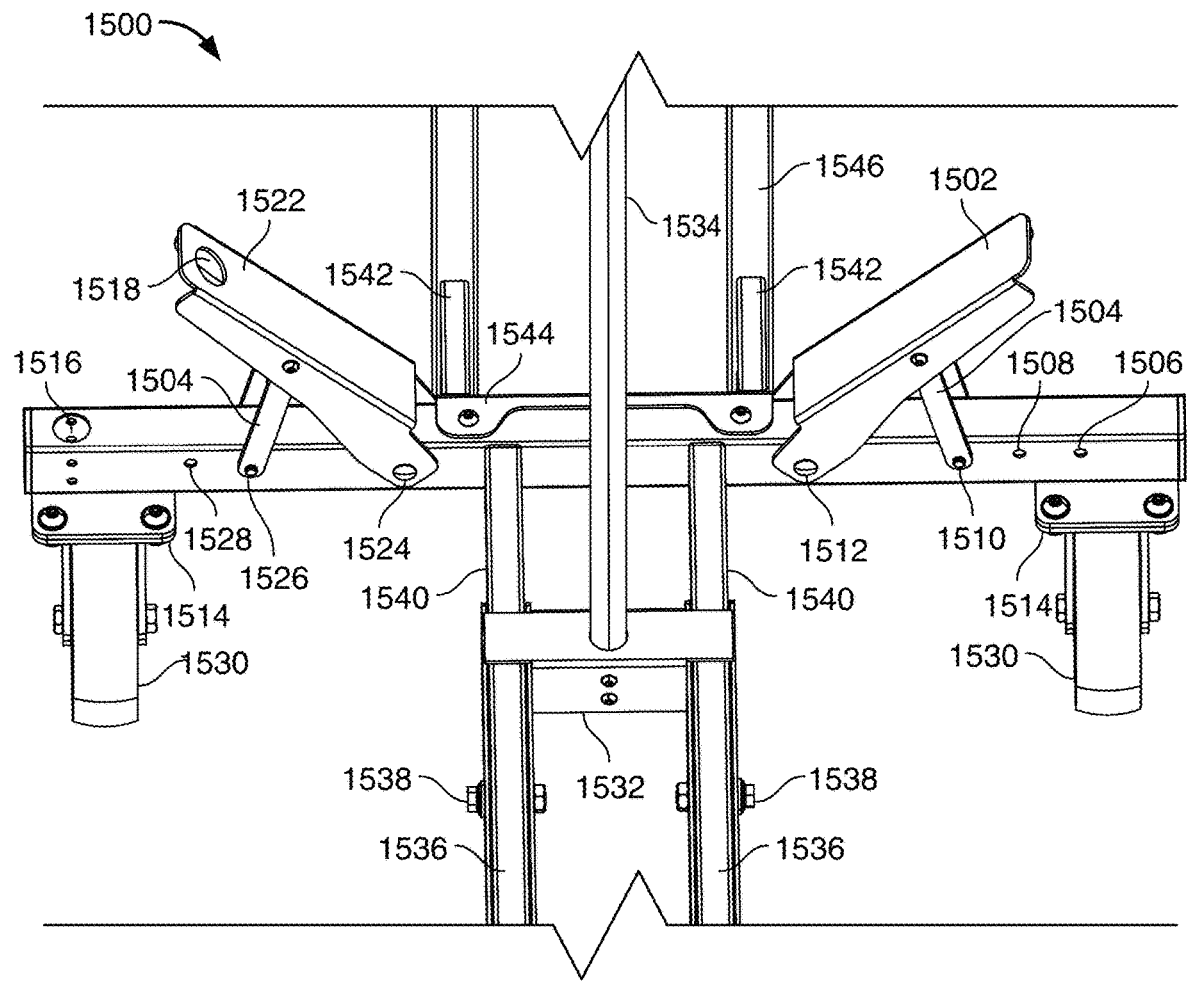
FIG. 15 shows another illustrative apparatus in accordance with principles of this matter.

FIG. 15 shows an illustrative apparatus in accordance with the principles of the disclosure. FIG. 15 shows a portion of the multi-purpose dolly. End extension support bar assembly 1500 may form a first end extension. End extension support bar assembly 1500 may form a second end extension. End extension support bar assembly 1500 may include an end extension support bar. The support bar may be a first end extension support bar. The support bar may be a second end extension support bar.

End extension support bar assembly 1500 may include angle support 1502. Angle support 1502 may directly relate to angle support 1002, as shown in FIG. 10 and described in the portion of the specification corresponding thereto. End extension support bar assembly 1500 may include angle support locking assembly 1504. Angle support locking assembly 1504 may directly relate to angle support locking assembly 1010, as shown in FIG. 10 and described in the portion of the specification corresponding thereto. Angle support assembly, including angle support 1502 and angle support locking assembly 1504, may be rotatably coupled to the end extension support bar. Rivet 1512 may fixedly mount angle support 1502 to the extension support bar. Screw 1510 may rotatably mount angle support locking assembly 1504 to the end support bar.

In some embodiments, screw 1510 may rotatably couple angle support locking assembly 1504 to the end extension support bar at a different angle. In such embodiments, aperture 1508 or 1506 may be used. As such, the angle support assembly may be rotatably coupled at different angles.

There may be a second angle support assembly included in end extension support bar assembly 1500. The second angle support assembly may be an angle support assembly with a hole. The angle support assembly with a hole may include angle support 1522 and angle support locking assembly 1504. The angle support assembly with a hole may directly relate to angle support assembly 900, as shown in FIG. 9 and described in the portion of the specification corresponding thereto.

The angle support assembly with a hole, angle support 1522 and angle support locking assembly 1504, may be rotatably coupled to the end extension support bar. Rivet 1524 may fixedly mount angle support 1522 to the extension support bar. Screw 1526 may rotatably couple angle support locking assembly 1504 to the end support bar.

In some embodiments, screw 1526 may rotatably couple angle support locking assembly 1504 to the end extension support bar at a different angle. In such embodiments, aperture 1528 may be used. Therefore, the angle support assembly may be rotatably coupled at a different angle.

There may be a hole in angle support 1522. The hole may be hole 1518. Hole 1518 may be a hole for placement of a support tube. The support tube may be support tube 1534. In some embodiments, support tube 1534 may preferably be mounted to middle connection 1532. In other embodiments, support tube 1534 may preferably be mounted into end extension support bar. The end extension support bar may include hole 1516. Hole 1516 may correspond to hole 1518. Support tube 1534 may preferably be mounted into holes 1516 and 1518. In such embodiments, the width of the furniture may be greater than a predetermined width. In an embodiment where the support tube is mounted onto middle connection 1532, the furniture may be less than a predetermined width.

In certain embodiments, support tubes 1534 may be mounted onto the multi-purpose dolly using holes 1516 and 1518. In such embodiments, angle support assembly 1522 may be mounted to the end extension support bar at a 180° angle. In such embodiments, angle support assembly 1502 and angle support locking assembly 1504 may be engaged to end extension support bar using aperture 1506.

End extension support bar assembly 1500 may include caster mounting plates 1514. There may be two, or any other suitable number of caster mounting plates 1514. Caster mounting plates 1514 may be mounted to a bottom side of the extension support bar. End extension support bar assembly 1500 may include caster 1530. Casters 1530 may be lock swivel casters. Casters 1530 may be swivel casters. Casters 1530 may be rigid casters. Screws may be fastened through casters 1530 and caster mounting plates 1514 to mount casters 1530 to the multi-purpose dolly.

End extension support bar assembly may include extension tubes 1540. Extension tubes 1540 may be mounted to the extension support bar. Extension tubes 1540 may slide into crossbar channels 1536. Hexagon screws 1538 may be used to facilitate mounting extension tubes 1540 to crossbar channels 1536. There may be three, or any other suitable number of different apertures at which hexagon screws 1538 may be used to facilitate mounting to crossbar channels 1536. The three, or any other suitable number of different apertures may provide the multi-purpose dolly with three, or any other suitable, varied sizes. The three sizes may include a 60-inch dolly, a 72-inch dolly and a 96-inch dolly.

End extension assembly may include handle frame support 1544. Handle frame support 1544 may preferably be mounted onto the end extension support bar. Handle frame support 1544 may be welded to handle frame attachments 1542. Handle frame attachments 1542 may be welded to handlebar 1546. As such, handlebar 1546 may be mounted to the multi-purpose dolly.

Figure 16:
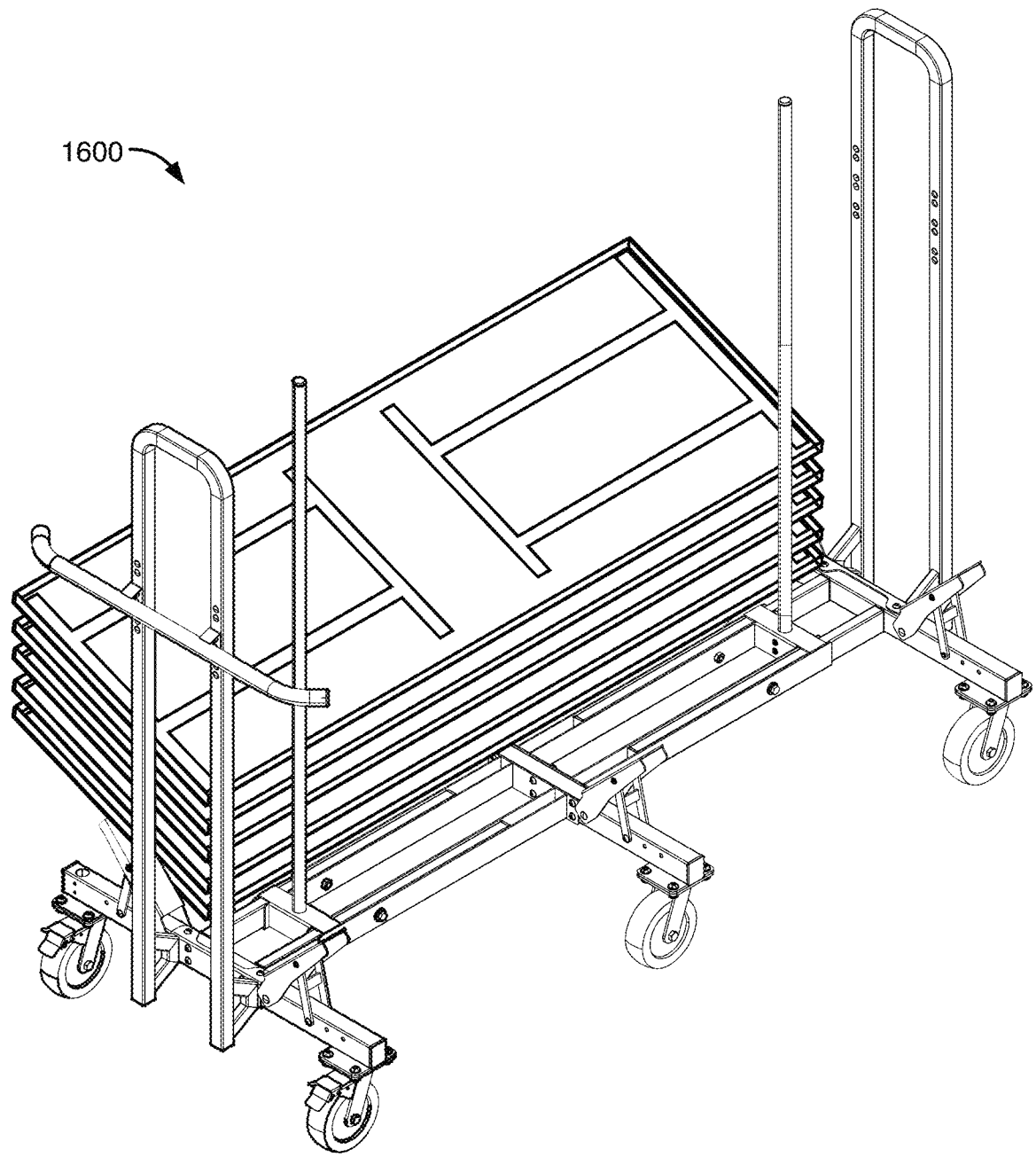
FIG. 16 shows yet another illustrative apparatus in accordance with principles of this matter.

FIG. 16 shows multi-purpose dolly 1600. Multi-purpose dolly 1600 shows a dolly using two support tubes mounted to the middle connections. The support tubes may secure furniture held on the dolly at an angle.

Figure 17:
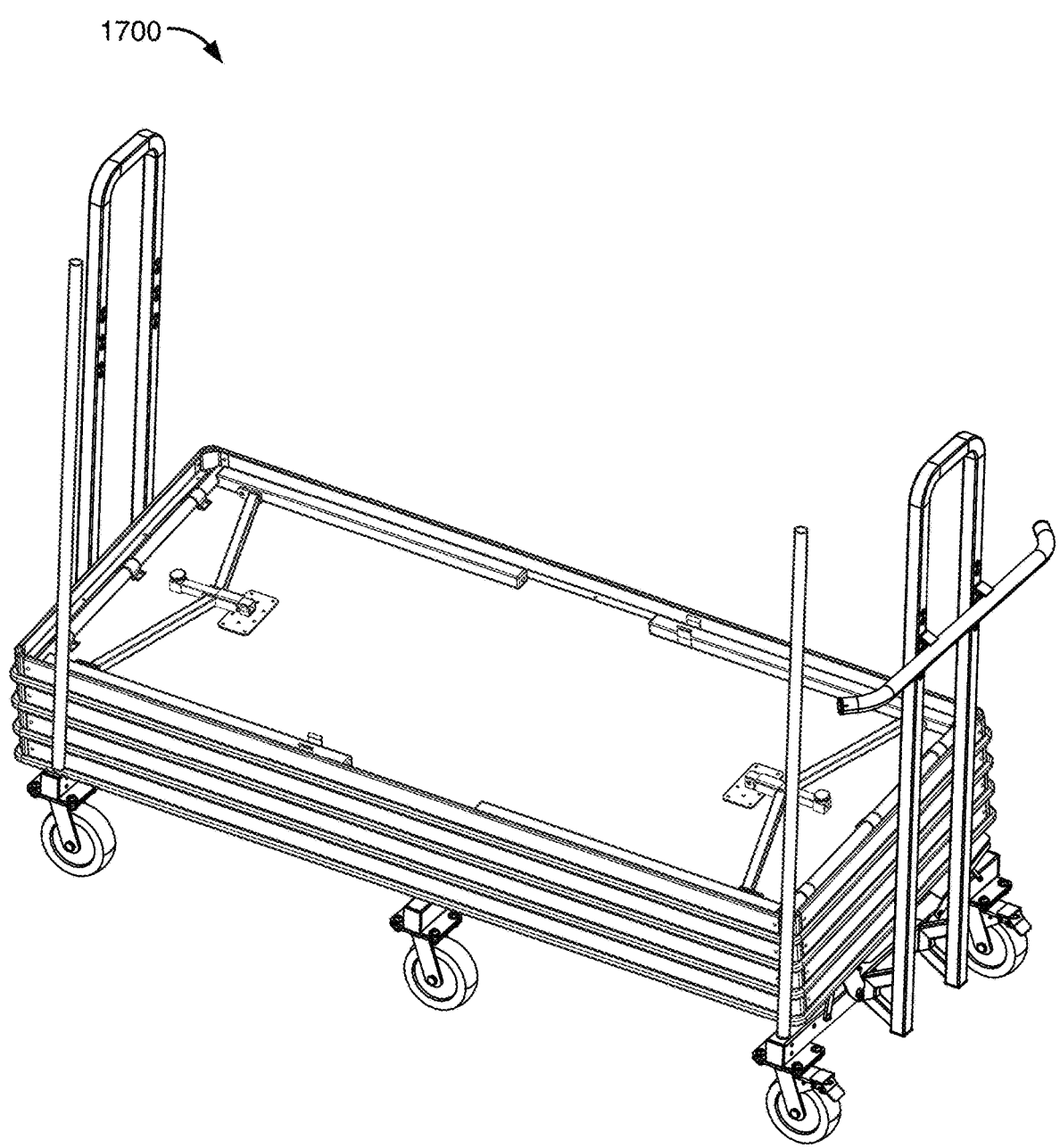
FIG. 17 shows still another illustrative apparatus in accordance with principles of this matter.

FIG. 17 shows multi-purpose dolly 1700. Multi-purpose dolly 1700 shows a dolly using two support tubes mounted to the end extension support bars. The support tubes may secure furniture laying flush on the dolly.

Figure 18:
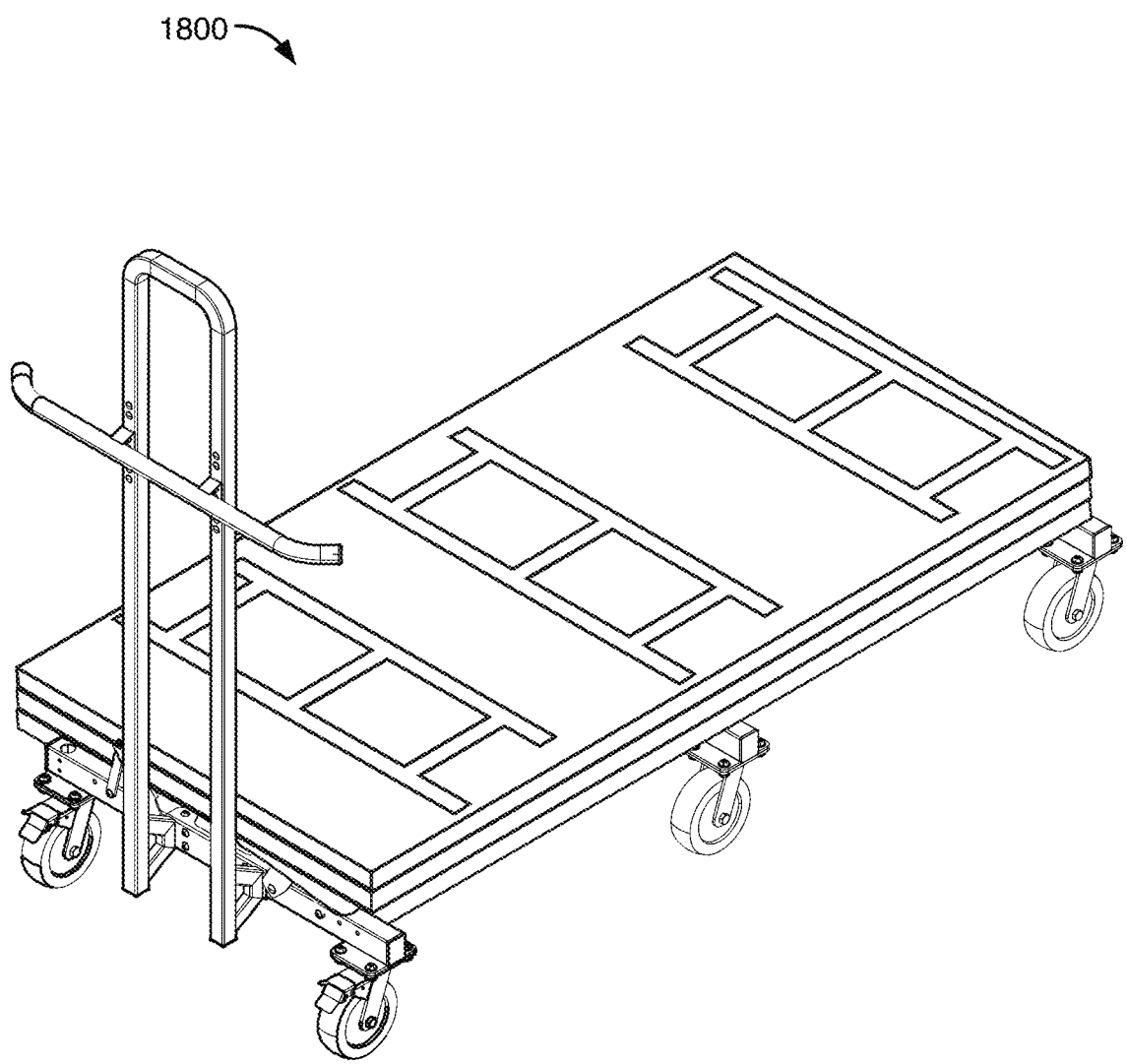
FIG. 18 shows an illustrative apparatus in accordance with principles of this matter.

FIG. 18 shows multi-purpose dolly 1800. Multi-purpose dolly 1800 is a multi-purpose dolly without the support tubes. It should be noted that multi-purpose dolly 1800 may transport and store furniture greater than the length and/or width of the multi-purpose dolly.

Figure 19:
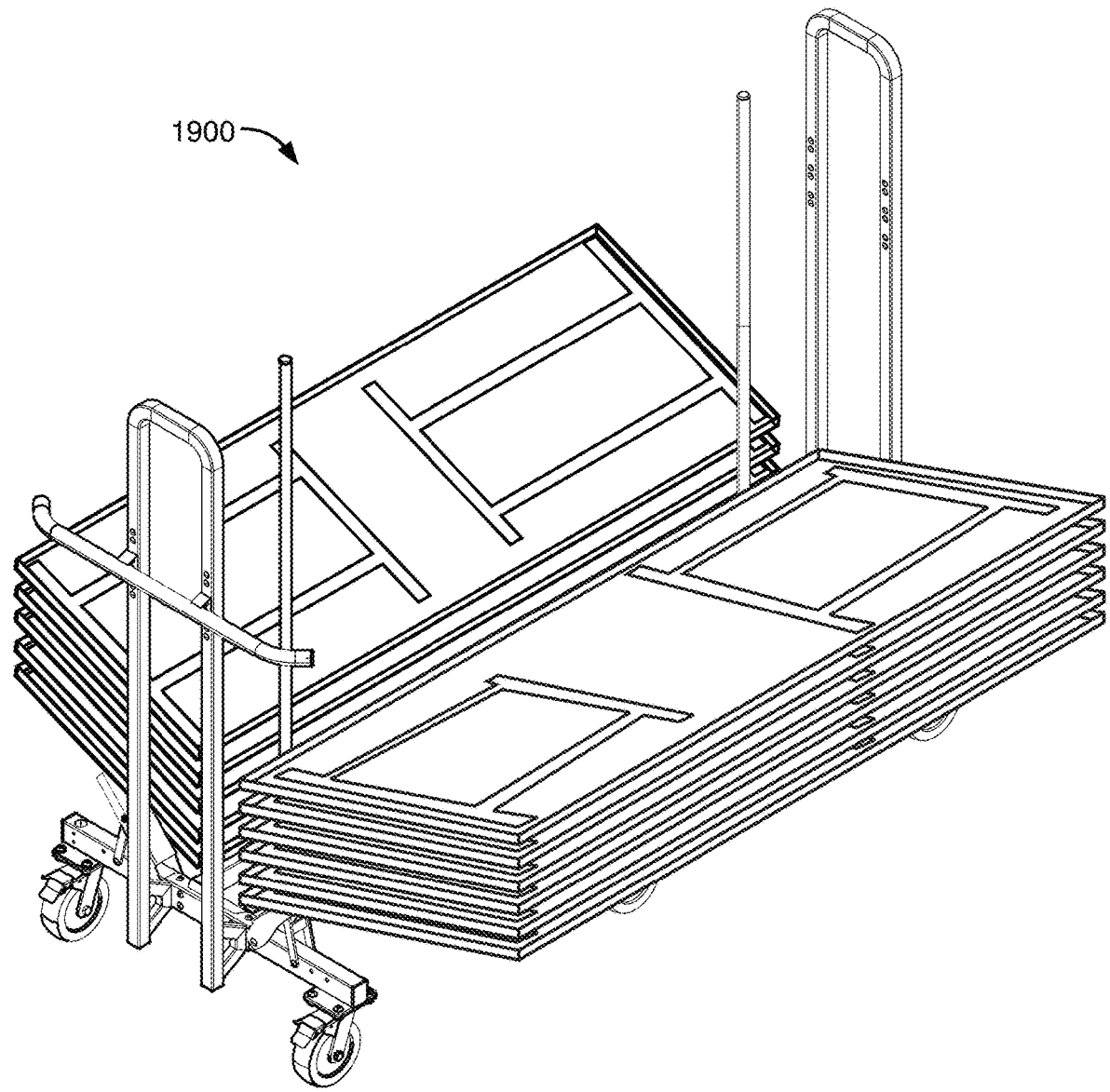
FIG. 19 shows another illustrative apparatus in accordance with principles of this matter.

FIG. 19 shows multi-purpose dolly 1900. Multi-purpose 1900 shows a dolly using two support tubes mounted to the middle connections. The support tubes may secure furniture held on the dolly at an angle.

Figure 20:
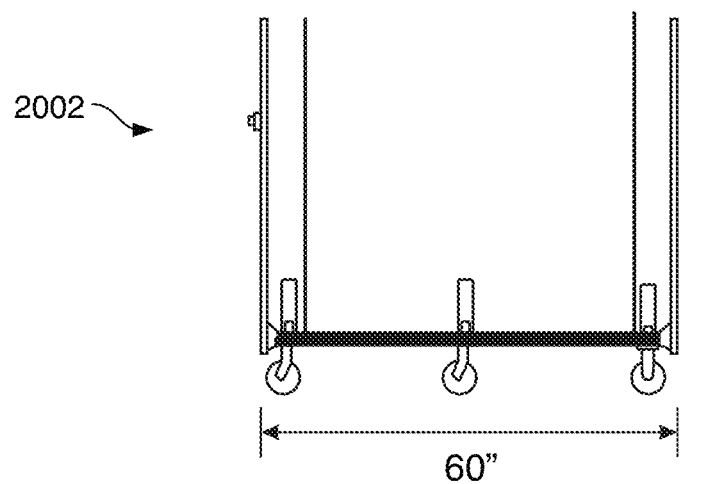
FIG. 20 shows yet another illustrative apparatus in accordance with principles of this matter.
Figure 20:
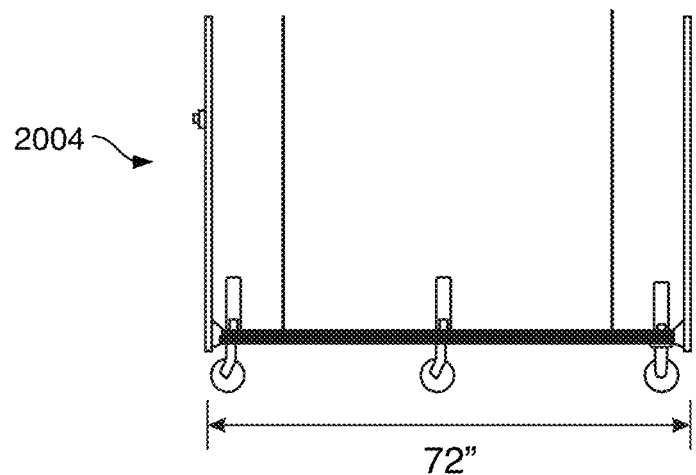
Figure 20:
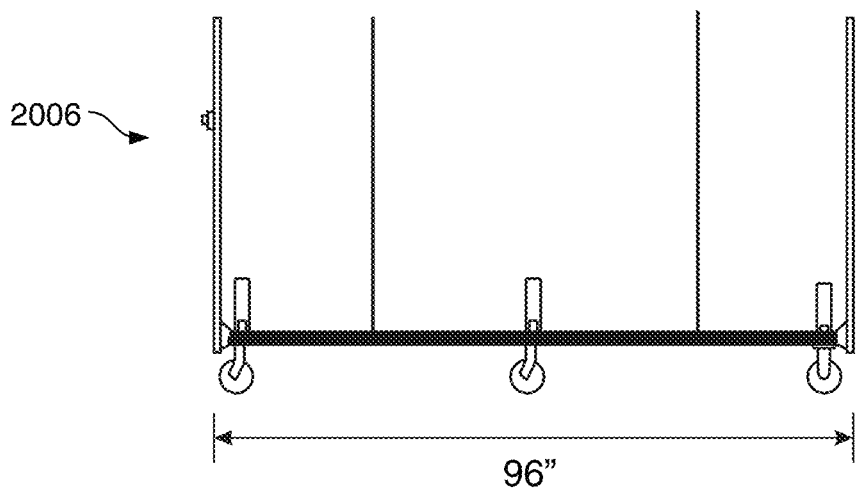

FIG. 20 shows multi-purpose dollies 2002, 2004 and 2006. Multi-purpose dolly 2002 is an extendable multi-purpose dolly. Multi-purpose dolly 2002 may be extended to a length of 60-inches. Multi-purpose dolly 2004 may be an extended multi-purpose dolly. Multi-purpose dolly 2004 may be extended to a length of 72-inches. Multi-purpose dolly 2006 may be an extendable multi-purpose dolly. Multi-purpose dolly 2006 may be extended to a length of 96-inches.

Thus, methods and systems for a MULTIPLE PURPOSE DOLLY are provided. Persons skilled in the art will appreciate that the present invention can be practiced by other than the described embodiments, which are presented for purposes of illustration rather than of limitation, and that the present invention is limited only by the claims that follow.

What is claimed is:

1. A multi-purpose dolly, the multi-purpose dolly for storing and transferring furniture or objects of ranging sizes, the multi-purpose dolly comprising:
a center frame assembly, the center frame assembly comprising a longitudinal axis and a horizontal axis, the horizontal axis being orthogonal to the longitudinal axis, the center frame assembly being centrally located with respect to the multi-purpose dolly, the center frame assembly forming a bottom portion of the multi-purpose dolly;
wherein the center frame assembly comprises:
a first middle frame assembly; and
a second middle frame assembly;
a first end extension assembly, the first end extension assembly forming a first end portion of the multi-purpose dolly, wherein the first end extension assembly is configured to be slidably mounted to the first middle frame assembly;
a second end extension assembly, the second end extension assembly forming a second end portion of the multi-purpose dolly, wherein the second end extension assembly is configured to be slidably mounted to the second middle frame assembly;
a fixed handlebar located at the first end portion of the multi-purpose dolly;
a removable handlebar located at the second end portion of the multi-purpose dolly;
a first removable support bar located at the first end portion of the multi-purpose dolly;
a second removable support bar located at the second end portion of the multi-purpose dolly;
wherein each of the first removable support bar and the second removable support bar are configured to be fixed in a plurality of apertures within the multi-purpose dolly; and
six angle support assemblies;
wherein two of the angle support assemblies form a part of the center frame assembly;
wherein two of the angle support assemblies form a part of the first end extension assembly; and
wherein two of the angle support assemblies form a part of the second end extension assembly.

2. The multi-purpose dolly of claim 1 wherein the center frame assembly further comprises:
a middle support bar, the middle support bar centrally located within the center frame assembly, centrally with respect to the longitudinal axis;
wherein the middle support bar comprises four sides, a top side, a first side, a bottom side and a second side;
wherein the middle support bar further comprises two caster mounting plates, each of the two caster mounting plates being mounted to an end of the bottom side of the middle support bar;
two swivel casters;
wherein a first of the swivel caster is configured to be mounted to a first of the two caster mounting plates located at a first end of the bottom side; and
wherein a second of the swivel caster is configured to be mounted to a second of the two caster mounting plates located at a second end of the bottom side;
two of the angle support assemblies;
wherein a first angle support assembly is rotatably coupled to the middle support bar, rotatably coupled onto a first portion of the top side, said first portion formed from a first side of the longitudinal axis; and
wherein a second angle support assembly is rotatably coupled to the middle support bar, rotatably coupled onto a second portion of the top side, said second portion formed from a second side of the longitudinal axis;
the first middle frame assembly;
wherein the first middle frame assembly is configured to be mounted to a center of the first side of the middle support bar, said center is centered with respect to the longitudinal axis; and
the second middle frame assembly; and
wherein the second middle frame assembly is configured to be mounted to a center of the second side of the middle support bar, said center is centered with respect to the longitudinal axis.

3. The center frame assembly of claim 2 wherein the first middle frame assembly further comprises:
a first middle connection, the first middle connection being of rectangular shape;
two first crossbar channels, each of the two first crossbar channels having a closed end, a right outer side, a left outer side, an open end, a right inner side, a left inner side, a first edge and a second edge, the two first crossbar channels configured to be tracks for the first end extension assembly;
wherein the first middle connection is mounted to a first end of the open end of each of the two first crossbar channels; and
a first crossbar mounting plate;
wherein the second edge of the first of the first crossbar channels is configured to be mounted to an end of the first crossbar mounting plate; and
wherein the second edge of the second of the first crossbar channels is configured to be mounted to a second end of the first crossbar mounting plate.

4. The center frame assembly of claim 2 wherein the second middle frame assembly further comprises:
a second middle connection, the second middle connection being of a rectangular shape;
two second crossbar channels, each of the two second crossbar channels having a closed end, a right outer side, a left outer side, an open end, a right inner side, a left inner side, a first edge and a second edge, the two second crossbar channels configured to be tracks for the second end extension assembly; and
wherein the second middle connection is mounted to a first end of the open end of each of the two second crossbar channels; and
a second crossbar mounting plate;
wherein the second edge of a first of the second crossbar channels are configured to be mounted an end of the second crossbar mounting plate; and
wherein the second edge of the second of the second crossbar channels are configured to be mounted to a second end of the second crossbar mounting plate.

5. The multi-purpose dolly of claim 1 wherein the first end extension assembly further comprises:
two first end extension tubes, each of the two first end extension tubes are configured to slide into two first crossbar channels;
a first end extension support bar;
wherein the first end extension support bar comprises four sides, a top side, a first side, a bottom side and a second side;
wherein the first end extension support bar comprises two caster mounting plates, each of the two caster mounting plates being mounted to an end of the bottom side of the first end extension support bar;
wherein the first end extension support bar is configured to be mounted to a back end of the two first end extension tubes;
two of the angle support assemblies;
wherein a first angle support assembly is rotatably coupled to the first end extension support bar, rotatably coupled onto a first portion of the top side of the first end extension support bar, said first portion formed from a first side of the longitudinal axis; and
wherein a second angle support assembly is rotatably coupled to the first end extension support bar, rotatably coupled onto a second portion of the top side of the first end extension support bar, said second portion formed from a second side of the longitudinal axis;
two lock swivel casters;
wherein a first lock swivel caster is mounted to one of the caster mounting plates; and
wherein a second lock swivel caster is mounted to one of the caster mounting plates;
the fixed handlebar, wherein the fixed handlebar is mounted to the second side of the first end extension support bar; and
a handle grip, said handle grip mounted to the fixed handlebar.

6. The multi-purpose dolly of claim 1 wherein the second end extension assembly further comprises:
two second end extension tubes, each of the two second end extension tubes are configured to slide into two second crossbar channels;
a second end extension support bar;
wherein the second end extension support bar comprises four sides, a top side, a first side, a bottom side and a second side;
wherein the second end extension support bar comprises two caster mounting plates, each of the two caster mounting plates being mounted to an end of the bottom side of the second end extension support bar;
wherein the second end extension support bar is configured to be mounted to a back end of the two second end extension tubes;
two of the angle support assemblies;
wherein a first angle support assembly is rotatably coupled to the second end extension support bar, rotatably coupled onto a first portion of the top side of the second end extension support bar, said first portion formed from a first side of the longitudinal axis;
wherein a second angle support assembly is rotatably coupled to the second end extension support bar, rotatably coupled on a second portion of the top side of the second end extension support bar, said second portion formed from a second side of the longitudinal axis;
two rigid casters;
wherein a first rigid caster is mounted to a first of the caster mounting plates; and
wherein a second rigid caster is mounted to a second of the caster mounting plates; and
the removable handlebar being mounted to the second side of the second end extension support bar.

7. The multi-purpose dolly of claim 1 wherein the multi-purpose dolly is adjustable to handle: up to and including 60-inch-long furniture; up to and including 72-inch-long furniture; up to and including 96-inch-long furniture; and furniture exceeding a length of 96-inches.

8. The multi-purpose dolly of claim 1 wherein the handle grip is height adjustable.

9. The multi-purpose dolly of claim 1 wherein the multi-purpose dolly comprises steel, aluminum, wood, metal, or plastic.

10. The multi-purpose dolly of claim 1 wherein the angle support assemblies adjust to ranging angles, said ranging angles to store furniture at ranging angles.

* * * * *